(12) United States Patent
Kwon et al.

(10) Patent No.: US 11,538,846 B2
(45) Date of Patent: Dec. 27, 2022

(54) DISPLAY, ELECTRONIC DEVICE HAVING THE DISPLAY, AND METHOD OF ESTIMATING BIO-INFORMATION USING THE ELECTRONIC DEVICE

(71) Applicant: SAMSUNG ELECTRONICS CO., LTD., Suwon-si (KR)

(72) Inventors: Yong Joo Kwon, Yongin-si (KR); Jae Min Kang, Seoul (KR); Byung Hoon Ko, Hwaseong-si (KR); Youn Ho Kim, Hwaseong-si (KR); Sang Yun Park, Hwaseong-si (KR); Jong Wook Lee, Suwon-si (KR); Deuk Seok Chung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 16/906,149

(22) Filed: Jun. 19, 2020

(65) Prior Publication Data
US 2021/0036046 A1 Feb. 4, 2021

(30) Foreign Application Priority Data

Jul. 30, 2019 (KR) .................. 10-2019-0092524
Feb. 25, 2020 (KR) .................. 10-2020-0022964

(51) Int. Cl.
| | |
|---|---|
| *G06T 1/00* | (2006.01) |
| *G06F 21/32* | (2013.01) |
| *H01L 27/146* | (2006.01) |
| *G09G 3/32* | (2016.01) |
| *G06V 30/32* | (2022.01) |

(52) U.S. Cl.
CPC ........ *H01L 27/14643* (2013.01); *G06F 21/32* (2013.01); *G06T 1/0007* (2013.01); *G06V 30/333* (2022.01); *G09G 3/32* (2013.01); *H01L 27/14612* (2013.01); *G09G 2310/0275* (2013.01); *G09G 2310/0297* (2013.01)

(58) Field of Classification Search
CPC ............................. G06F 21/32; G06T 1/0007
See application file for complete search history.

(56) References Cited

U.S. PATENT DOCUMENTS

| | | | |
|---|---|---|---|
| 8,797,306 | B2 | 8/2014 | Gotoh et al. |
| 8,802,462 | B2 | 8/2014 | Yamazaki |
| 10,275,094 | B2 | 4/2019 | Kim et al. |
| 10,360,858 | B2 | 7/2019 | Yamazaki |

(Continued)

FOREIGN PATENT DOCUMENTS

| | | | |
|---|---|---|---|
| JP | 5292077 | B2 | 9/2013 |
| JP | 5330124 | B2 | 10/2013 |

(Continued)

*Primary Examiner* — Thanh Luu
(74) *Attorney, Agent, or Firm* — Sughrue Mion, PLLC

(57) ABSTRACT

A display includes a display portion formed of an array of unit pixels that each respectively include a light source pixel and a detector pixel. The display includes a control driver including a light source driver and a data driver which are respectively connected to each light source pixel, and a detector driver which is connected to each detector pixel. The display includes a controller configured to control the control driver to operate the display portion in a first mode, a second mode, and a third mode that are each different from each other.

32 Claims, 29 Drawing Sheets

(56) References Cited

U.S. PATENT DOCUMENTS

| | | | |
|---|---|---|---|
| 2006/0001914 A1* | 1/2006 | Mesmer | H04N 1/00127 |
| | | | 358/401 |
| 2009/0141004 A1 | 6/2009 | Yamazaki | |
| 2018/0349669 A1 | 12/2018 | Kim et al. | |
| 2019/0012967 A1 | 1/2019 | Lee et al. | |
| 2019/0313979 A1 | 10/2019 | Kang et al. | |
| 2019/0318698 A1* | 10/2019 | Yamazaki | |
| 2020/0203434 A1* | 6/2020 | Steudel | G06V 40/1318 |
| 2021/0327979 A1* | 10/2021 | Kamada | H05B 33/12 |

FOREIGN PATENT DOCUMENTS

| | | |
|---|---|---|
| JP | 5347035 B2 | 11/2013 |
| JP | 5824096 B2 | 11/2015 |
| KR | 10-1279275 B1 | 6/2013 |
| KR | 10-2018-0051999 A | 5/2018 |
| KR | 10-2018-0085097 A | 7/2018 |
| KR | 10-2019-0119414 A | 10/2019 |

* cited by examiner

FIG. 5A

| 1 | 2 | 3 | 4 | 5 | 6 | 7 | 8 | 9 | 10 | 11 | 12 |
|---|---|---|---|---|---|---|---|---|---|---|---|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 |
| 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 |
| 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 |
| 205 | 206 | 207 | 208 | 209 | 210 | 211 | 212 | 213 | 214 | 215 | 216 |

FIG. 5B

| # | DRIVING DATA 1 | |
|---|---|---|
|   | PD # | LED # |
| 1 | 114 | 30 |
| 2 | 114 | 30 |
| 3 | 114 | 30 |
| 4 | 114 | 30 |
| 5 | 114 | 30 |
| 6 | . | . |
| . | . | . |

| # | DRIVING DATA 2 | |
|---|---|---|
|   | PD # | LED # |
| 1 | 113 | 30 |
| 2 | 114 | 30 |
| 3 | 115 | 30 |
| 4 | 113 | 30 |
| 5 | 114 | 30 |
| 6 | 115 | . |
| . | . | . |

| # | DRIVING DATA 3 | |
|---|---|---|
|   | PD # | LED # |
| 1 | 114 | 30 |
| 2 | 114 | 31 |
| 3 | 114 | 32 |
| 4 | 114 | 30 |
| 5 | 114 | 31 |
| 6 | 114 | 32 |
| . | . | . |

| # | DRIVING DATA 4 | |
|---|---|---|
|   | PD # | LED # |
| 1 | 1 | 1 |
| 2 | 2 | 2 |
| 3 | 3 | 3 |
| 4 | 4 | 4 |
| 5 | 5 | 5 |
| 6 | 6 | 6 |
| . | . | . |

| # | DRIVING DATA 5 | |
|---|---|---|
|   | PD # | LED # |
| 1 | 114 | 1 |
| 2 | 114 | 30 |
| 3 | 114 | 2 |
| 4 | 114 | 30 |
| 5 | 114 | 3 |
| 6 | 114 | 30 |
| . | . | . |

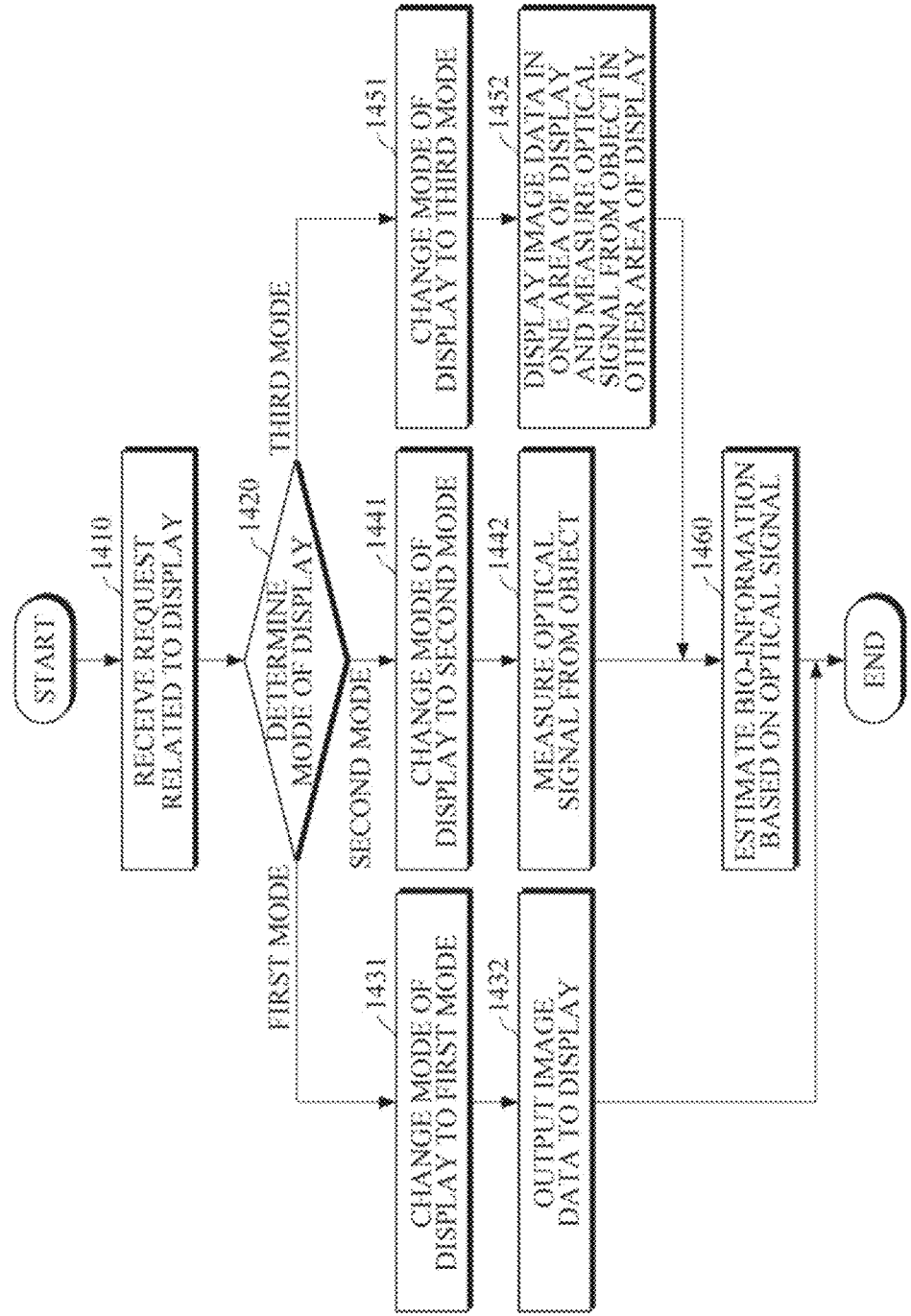

DISPLAY, ELECTRONIC DEVICE HAVING THE DISPLAY, AND METHOD OF ESTIMATING BIO-INFORMATION USING THE ELECTRONIC DEVICE

CROSS-REFERENCE TO RELATED APPLICATION(S)

This application is based on and claims priority under 35 U.S.C. § 119 to Korean Patent Application No. 10-2019-0092524, filed on Jul. 30, 2019, and Korean Patent Application No. 10-2020-0022964, filed on Feb. 25, 2020, in the Korean Intellectual Property Office, the disclosures of which are incorporated by reference herein in their entireties.

BACKGROUND

1. Field

The disclosure relates generally to a display having a light sensing function, and more particularly to an electronic device having the display and technology for estimating bio-information using the electronic device.

2. Description of Related Art

Devices, such as a wearable device, a smart device, and the like, generally have displays for displaying images. Recently, in addition to the function of displaying images, the display has a touch screen for detecting touches when a user's hand, a touch pen, or the like, touches a specific position of the touch screen. With a growing interest in health, research has been conducted to non-invasively measure bio-information, such as blood pressure, by separately providing an optical sensor for such wearable devices or smart devices. However, since the display for displaying images and the optical sensor having a light sensing function are separately mounted in the general devices, it is difficult to manufacture these general devices in a compact size.

SUMMARY

Additional aspects will be set forth in part in the description which follows and, in part, will be apparent from the description, or may be learned by practice of the presented embodiments.

In accordance with an aspect of an example embodiment, a display includes a display portion formed of an array of unit pixels that each respectively include a light source pixel and a detector pixel. The display includes a control driver including a light source driver and a data driver which are respectively connected to each light source pixel, and a detector driver which is connected to each detector pixel. The display includes a controller configured to control the control driver to operate the display portion in a first mode, a second mode, and a third mode that are each different from each other.

The light source pixel includes one or more light emitting diode (LED) pixels which emit light of one or more wavelengths; and the detector pixel includes a photodiode (PD) pixel which receives light scattered or reflected from an object, and converts the received light into an electric signal.

Each of the one or more LED pixels has a 2-transistor 1-capacitor (2T1C) structure; and the PD pixel has a 4-transistor (4T) structure or a 3-transistor (3T) structure.

In response to an input of driving data corresponding to the first mode, the controller is configured to deactivate the detector driver, and control the light source driver and the data driver to drive predetermined light source pixels of the display portion based on the driving data to display an image.

The driving data includes at least one of a driving sequence, a wavelength, and a duration of the predetermined light source pixels of the array of unit pixels.

In response to an input of driving data corresponding to the second mode, the controller is configured to activate the detector driver, and control the light source driver, the data driver, and the detector driver to drive predetermined light source pixels and predetermined detector pixels of the display portion based on the driving data to acquire an optical signal from an object.

The driving data includes a position, a wavelength, and a duration of the predetermined light source pixels to be driven, and a position of the predetermined detector pixels to be driven.

In response to an input of driving data corresponding to the third mode, the controller is configured to activate the detector driver, and control the light source driver, the data driver, and the detector driver to drive predetermined light source pixels and predetermined detector pixels of the display portion based on the driving data to output an image in a first area of the display portion, and to acquire an optical signal in a second area of the display portion.

The driving data includes a driving sequence, a wavelength, and a duration of a first set of the predetermined light source pixels of the array of unit pixels included in the first area, and a position and a wavelength of a second set of the predetermined light source pixels to be driven and a position of the predetermined detector pixels to be driven in the second area.

The display includes a converter which is configured to be activated by the controller based on the display portion operating in the second mode or the third mode, and which is configured to receive an optical signal from the detector pixels of the display portion, and convert the optical signal into a digital signal.

The converter includes a multiplexer (MUX) connected to outputs of the detector pixels which are integrated for each column of the array of unit pixels, and an analog-digital converter (ADC) connected to the MUX. The inputs of the detector pixels of the array of unit pixels are integrated for each row to be connected to the detector driver.

The converter comprises an analog-digital converter (ADC) connected to outputs of each detector pixel of the array of unit pixels. The inputs of the detector pixels of the array of unit pixels are connected to the detector driver independently.

The converter includes a plurality of analog-digital converters (ADCs), each connected to outputs of the detector pixels which are integrated for each column of the array of unit pixels. The inputs of the detector pixels of the array of unit pixels are integrated for each row to be connected to the detector driver.

The converter includes a plurality of analog-digital converters (ADCs), each connected to outputs of each detector pixel of the array of unit pixels. The inputs of the detector pixels of the array of unit pixels are integrated to be connected to the detector driver.

An electronic device includes a display having an array of unit pixels that each respectively include a light source pixel and a detector pixel, and configured to operate in a first mode for displaying an image, a second mode for acquiring an optical signal, and a third mode for displaying the image and acquiring the optical signal; and a processor configured to:

determine whether the display is to operate in the first mode, the second mode, or the third mode; and control the display to operate in the first mode, the second mode, or the third mode.

The processor is configured to set the first mode as a default mode; and based on receiving a request for analyzing an object, control the display to operate in the second mode or the third mode.

Based on receiving the request for analyzing the object, the processor is configured to determine that the display is to operate in the second mode or the third mode based on at least one of a user's request, and a size and a performance of the display.

The processor is further configured to, based on determining that the display is to operate in the second mode, control the display to operate in the first mode to display guide information for acquiring the optical signal; and based on a predetermined period of time elapsing, control the display to operate in the second mode to acquire the optical signal from an object.

The processor is further configured to, based on determining that the display is to operate in the third mode, control the display to display guide information for acquiring the optical signal or an analysis result of an object in a first area of the display; and control the display to acquire the optical signal in a second area of the display.

The processor is further configured to, based on determining that the display is to operate in the second mode or the third mode, control the display to acquire a first optical signal from an object; and control the display to acquire a second optical signal for analyzing the object by analyzing a contact position of the object based on the acquired first optical signal.

The electronic device includes a fingerprint sensor configured to obtain fingerprint data of an object that contacts the display.

The processor is further configured to analyze the contact position of the object based on the fingerprint data; and control the display to acquire the optical signal or to display guide information based on analyzing the contact position.

The processor is further configured to obtain a fingerprint feature point based on the fingerprint data; and determine a light source pixel and a detector pixel to be driven for acquiring the optical signal based on the obtained fingerprint feature point.

The processor is further configured to, based on acquiring the optical signal from an object according to the second mode or the third mode, perform at least one of bio-information estimation, fingerprint authentication, document scanning, and image scanning by analyzing the object based on the acquired optical signal.

An electronic device includes a display having an array of unit pixels that each respectively include a light source pixel and a detector pixel, and configured to operate in a first mode for displaying an image, a second mode for acquiring an optical signal, and a third mode for displaying an image and acquiring an optical signal; and a processor configured to, based on receiving a request for estimating bio-information, control the display to operate in the second mode or the third mode to acquire a first optical signal from an object; and estimate bio-information based on the acquired first optical signal.

The display is configured to acquire the first optical signal by driving pairs of one or more light source pixels and detector pixels in a first area touched by the object.

The processor is further configured to determine the pairs of the light source pixels and the detector pixels in the first area based on a predetermined reference point in the first area.

The predetermined reference point comprises at least one of a center point of the first area and a fingerprint feature point which is obtained based on fingerprint data obtained by contact of the object.

The display is further configured to acquire the first optical signal while acquiring a plurality of second optical signals by driving pairs of a plurality of light source pixels and detector pixels in a second area including the first area.

The processor is further configured to correct the first optical signal based on the second optical signals; and estimate the bio-information based on the corrected first optical signal.

The electronic device includes a force sensor configured to measure a contact force based on the object, which is in contact with the display, applying pressure to the display.

The processor is further configured to, based on the object being in contact with the display, obtain a contact area based on a magnitude of an amount of light which is received by the detector pixel of the display; obtain a contact pressure based on the contact force and the contact area; and estimate the bio-information based on the contact pressure and the first optical signal.

The bio-information includes at least one of blood pressure, vascular age, arterial stiffness, aortic pressure waveform, vascular compliance, stress index, fatigue level, skin elasticity, skin age, triglyceride, cholesterol, blood glucose, and antioxidant index.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B are diagrams illustrating examples of driving data configured so that a display operates in a mode for acquiring an optical signal according to an embodiment;

FIG. 14 is a flowchart illustrating a method of estimating bio-information according to an embodiment.

DETAILED DESCRIPTION

Figure 1:
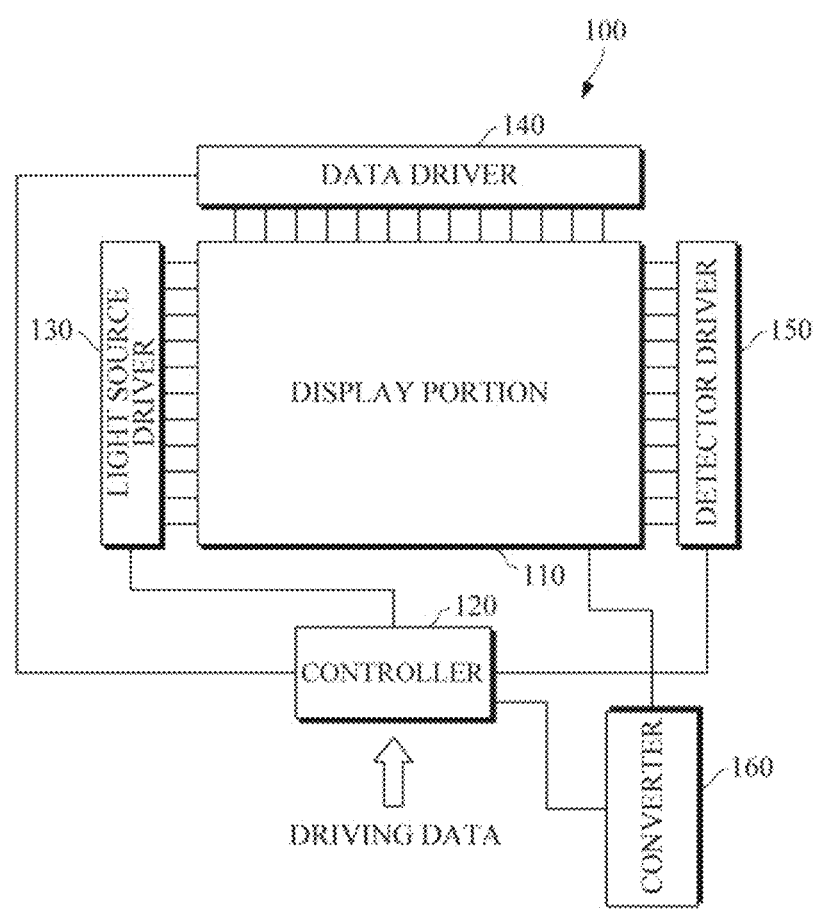
FIG. 1 is a block diagram illustrating a display according to an embodiment.

Details of the embodiments are included in the following detailed description and drawings. Advantages and features of the present disclosure, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms "first," "second," etc. may be used herein to describe various elements, these elements should not be limited by these terms. These terms are only used to distinguish one element from another. Also, the singular forms are intended to include the plural forms as well, unless the context clearly indicates otherwise. In the specification, unless explicitly described to the contrary, the term "comprise" and variations, such as "comprise" or "comprising", will be understood to imply the inclusion of stated elements but not the exclusion of any other elements. Terms, such as "part" and "module" denote units that process at least one function or operation and that may be implemented by using hardware, software, or a combination thereof.

Hereinafter, embodiments of a display will be described in detail with reference to the accompanying drawings. The display according to the embodiments of the present disclosure has a light sensing function, and may be mounted in various electronic devices. Examples of the electronic device may include a smartwatch worn on the wrist, various types of wearable devices such as a smart band type wearable device, a headphone type wearable device, a headband type wearable device, and the like, or a mobile device such as a smartphone, a tablet personal computer (PC), various types of information processing devices such as a desktop computer, a laptop computer, a navigation device, a television (TV), and the like, but are not limited thereto.

FIG. 1 is a block diagram illustrating a display according to an embodiment of the present disclosure.

Referring to FIG. 1, the display 100 includes a display portion 110, a controller 120, a light source driver 130, a data driver 140, a detector driver 150, and a converter 160.

The display portion 110 includes a display panel for displaying images. The display panel may include a touch screen for recognizing touches based on a user's finger, a touch pen, and the like, touching the touch screen.

Figure 2:
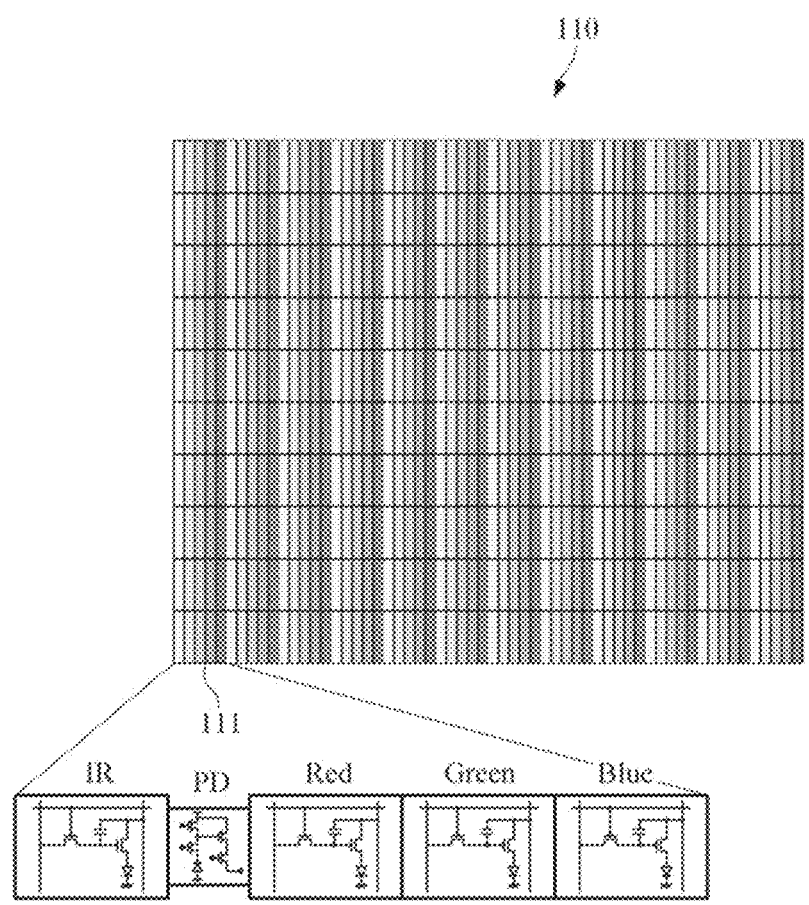
FIG. 2 is a diagram illustrating a structure of a display portion according to an embodiment.

FIG. 2 is a diagram illustrating a structure of a display portion according to an embodiment of the present disclosure.

Referring to FIG. 2, the display portion 110 according to an embodiment of the present disclosure may be formed of an array of unit pixels 111. Each unit pixel 111 may include a light source pixel and a detector pixel.

Each unit pixel 111 may include a light emitting diode (LED), a laser diode (LD), a phosphor, and the like, but is not limited thereto. As illustrated in FIG. 2, the light source pixel may include a plurality of infrared (IR), Red, Green, and Blue LED pixels which emit light of different wavelengths. However, the light source pixel is not limited to this structure, and some of the LED pixels, for example an IR LED pixel, may be excluded from the embodiment of FIG. 2. Further, the LED pixel may be formed to express white instead of RGB. Each of the IR, Red, Green, and Blue LED pixels may be driven in a general active matrix mode, and may have a 2-transistor 1-capacitor (2Tr-1C) structure.

A detector pixel of each unit pixel 111 may include a photodiode (PD) which detects light and converts the detected light into an electric signal (hereinafter referred to as an "optical signal"), but is not limited thereto. As illustrated in FIG. 2, the detector pixel of each unit pixel 111 may include one PD pixel (PD). The PD pixel (PD) may have a structure of a general complementary metal-oxide-semiconductor (CMOS) Image Sensor (CIS), and may be formed to have various structures such as a 4-transistor (4Tr) structure, a 3-transistor (3Tr) structure, or the like.

Referring back to FIG. 1, the controller 120 may control the light source driver 130, the data driver 140, and the detector driver 150 based on driving data, to operate the display portion 110 in any one of a first mode for displaying an image, a second mode for acquiring an optical signal from an object, and a third mode for simultaneously displaying an image and acquiring an optical signal.

The control driver may include a light source driver 130 and the data driver 140, which are electrically connected to the light source pixel of each unit pixel in the display portion 110, and the detector driver 150 which is electrically connected to the detector pixel of each unit pixel. In this case, the light source driver 130, the data driver 140, and the detector driver 150 may be formed of multiplexers (MUXs).

The driving data may be input from a processor of an electronic device, which has the display 100 or is connected to the display 100 via a wired or wireless communications network, and may include data related to driving the light source and the detector of each unit pixel.

For example, driving data for operating the display portion 110 in the first mode may include image data to be displayed, and may include, for example, a driving sequence, a wavelength, a duration, and the like, of each light source of the array of unit pixels 111, and the like. However, the driving data is not limited thereto.

In another example, driving data for operating the display portion 110 in the second mode may include data related to one or more light source-detector pairs to be driven, or data related to a single detector, to acquire an optical signal from an object. For example, the driving data may include light source data, such as a position, a wavelength, a duration, and the like, of a light source to be driven, and detector data such as a position of a detector to be driven. However, the driving data is not limited thereto.

In yet another example, driving data for operating the display portion 110 in the third mode may include light source data, such as a driving sequence, a wavelength, a duration, and the like, of each light source of each array of unit pixels 111 included in a first region of the display portion 110, to display image data in the first region of the display portion 110, and the like. Here, the first region indicates not only one physically continuous region, but also two or more divided regions. Further, the driving data may include data, related to one or more light source-detector pairs to be driven to acquire an optical signal from an object, in a second region of the display portion 110. For example, the driving data may include a light source data, such as a position, a wavelength, a duration, and the like, of a light source to be driven, and a detector data such as a position of a detector to be driven. However, the driving data is not limited thereto.

The converter 160 may be electrically connected to the controller 120 and the detector pixel (PD) of the display portion 110. The converter 160 is activated/deactivated under the control of the controller 120, and may convert an optical signal, output from the detector pixel (PD), into a digital signal and transmit the signal to the processor of the electronic device.

Figure 3A:
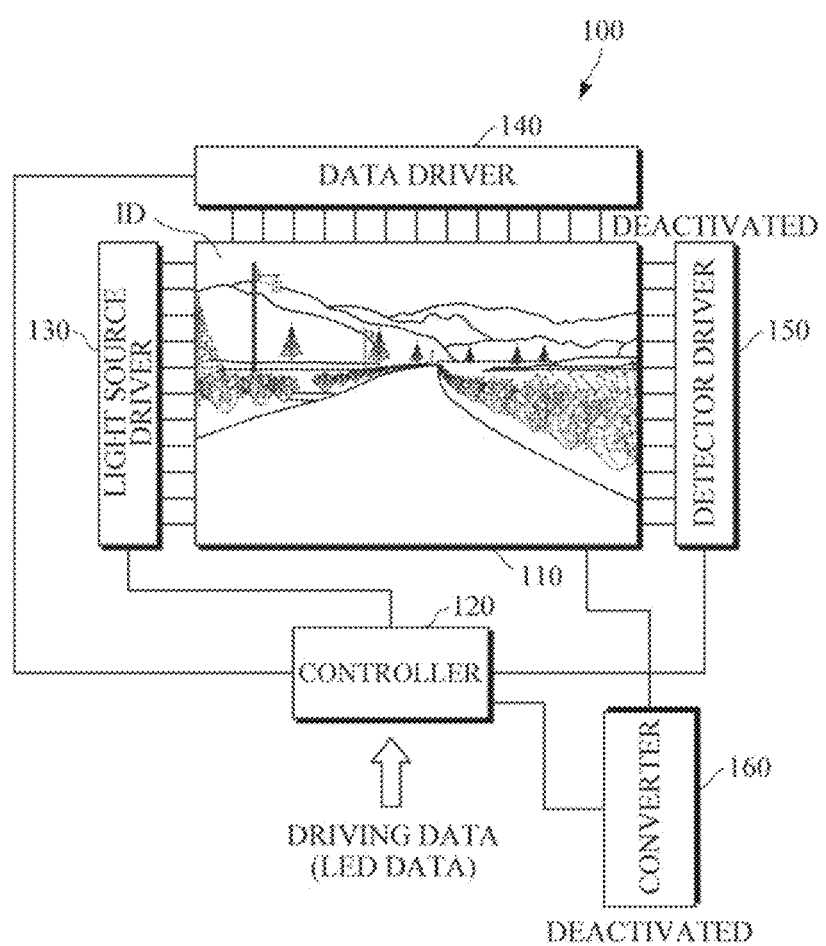
FIGS. 3A to 3C are diagrams explaining various operation modes of a display according to an embodiment.
Figure 3B:
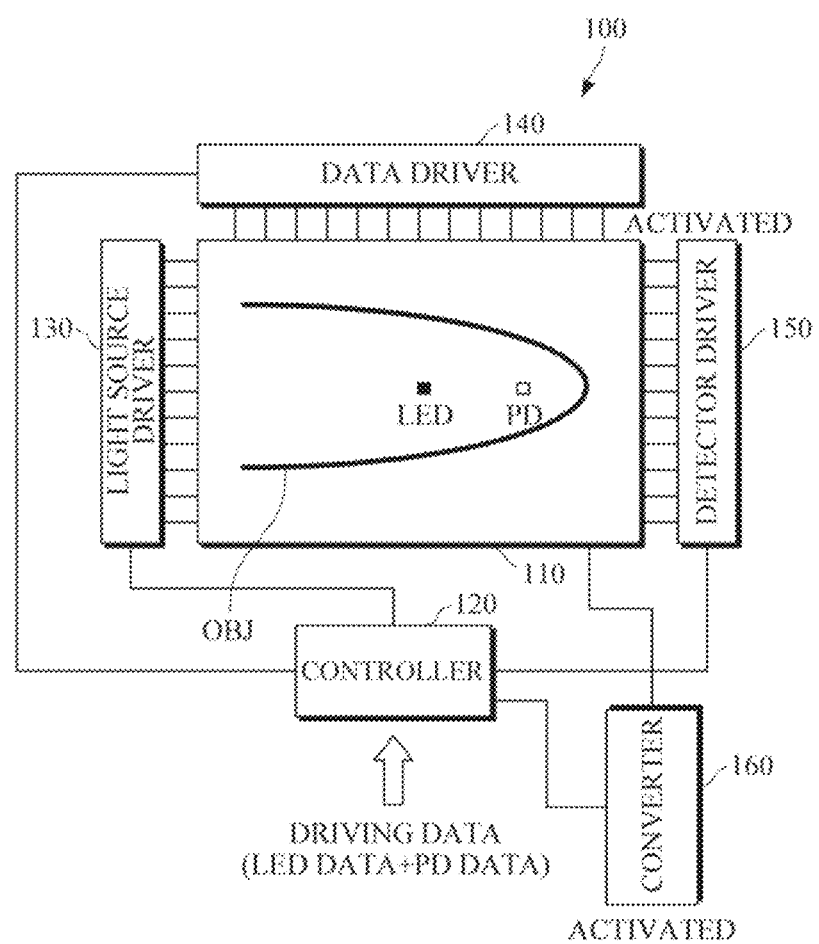
Figure 3C:
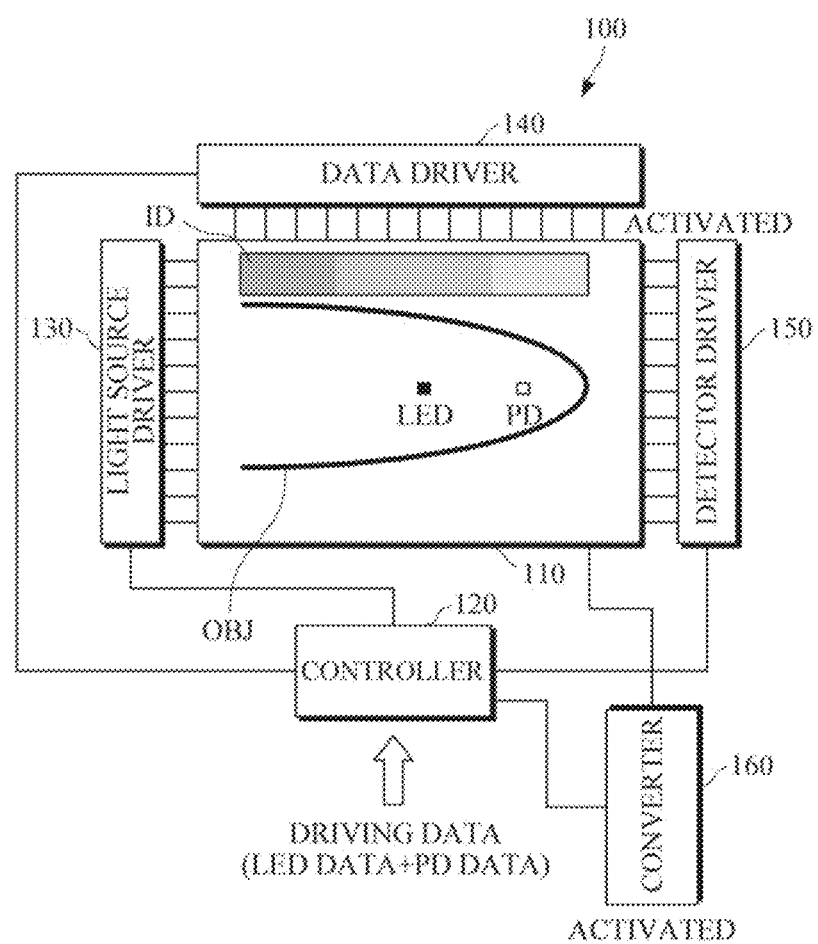

FIGS. 3A to 3C are diagrams explaining various operation modes of a display.

FIG. 3A is a diagram explaining an example of a display operating in a first mode. Referring to FIG. 3A, based on driving data being input, the controller 120 determines an operation mode of the display portion 110. Based on determining a first mode, the controller 120 may deactivate the detector driver 150, which drives the detector, and the converter 160 which receives an optical signal from the detector. Further, the controller 120 may transmit the driving data to the light source driver 130 and the data driver 140, so that the light source driver 130 and the data driver 140 may drive a light source of an array of unit pixels 111 to display an image. In this case, an image ID may be displayed in such a manner that the light source driver 130 outputs a signal for driving each light source to a light source pixel based on the driving data received from the controller 120, and the data driver 140 outputs image data to each light source pixel based on the driving data.

FIG. 3B is a diagram explaining an example of a display operating in a second mode. Referring to FIG. 3B, based on driving data being input, the controller 120 determines an operation mode of the display portion 110. Based on determining a second mode, the controller 120 may activate the detector driver 150, which drives the detector, and the converter 160 which receives an optical signal from the detector. Further, the controller 120 may transmit LED data, included in the driving data, to the light source driver 130 and the data driver 140, and may transmit PD data, included in the driving data, to the detector driver 150. Based on the received driving data, the light source driver 130, the data driver 140, and the detector driver 150 may drive a light source LEDi and a detector PDi at a corresponding position to detect an optical signal from an object OBJ. The converter 160 may receive the optical signal detected by the detector PDi from the object OBJ, and may convert the received optical signal into a digital signal and output the signal to the processor of the electronic device.

FIG. 3C is a diagram illustrating an example of a display operating in a third mode. Referring to FIG. 3C, based on driving data being input, the controller 120 determines an operation mode of the display portion 110. Based on determining a third mode, the controller 120 may activate the detector driver 150, which drives the detector, and the converter 160 which receives an optical signal from the detector. Further, the controller 120 may transmit LED data, included in the driving data, to the light source driver 130 and the data driver 140, and may transmit PD data, included in the driving data, to the detector driver 150. The light source driver 130 and the data driver 140 drive a light source in a first region of the display portion 110 to display an image ID, and the light source driver 130, the data driver 140, and the detector driver 150 may drive the light source LEDi and the detector PDi at a predetermined position in a second region of the display portion 110 to detect an optical signal from the object OBJ. The converter 160 may receive the optical signal detected by the detector PDi from the object OBJ, and may convert the received optical signal into a digital signal and output the signal to the processor of the electronic device.

FIGS. 4A to 4D are diagrams explaining various driving modes of a detector. For convenience of explanation, FIGS. 4A to 4D illustrate an array of unit pixels including four detectors PD1, PD2, PD3, and PD4, but the number of detectors is not limited thereto.

Figure 4A:
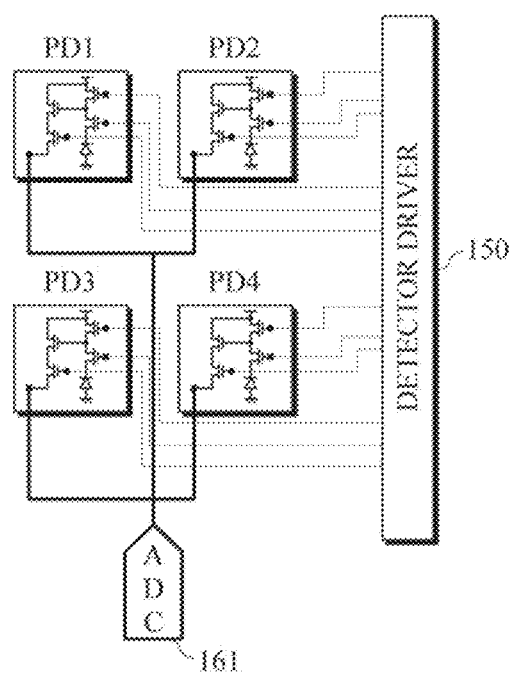
FIGS. 4A to 4D are diagrams explaining various driving modes of a detector according to an embodiment.

Referring to FIG. 4A, a first driving mode is set in which the converter 160 includes one analog-digital converter (ADC) 161 which may be connected to an output of each of four detectors PD1, PD2, PD3, and PD4 of the array of unit pixels. Further, an input of each of the four detectors PD1, PD2, PD3, and PD4 may be connected independently to the detector driver 150. As described above, the first driving mode is set such that an optical signal of any one detector, selected by the detector driver 150, may be output to the ADC 161.

Figure 4B:
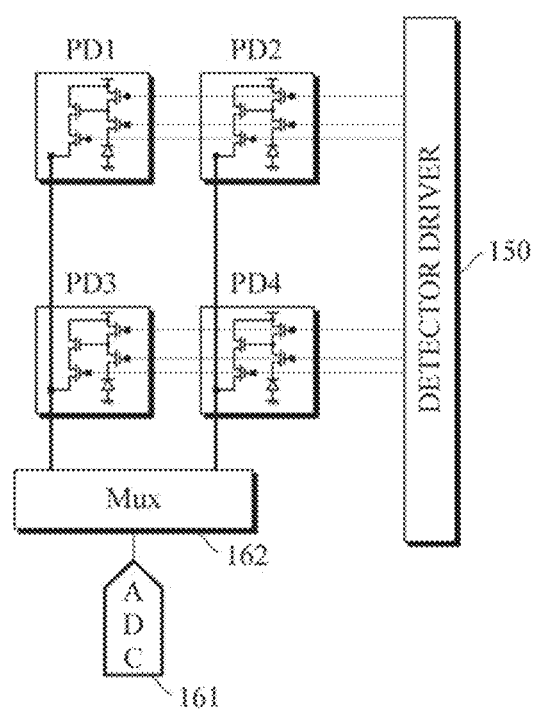

Referring to FIG. 4B, a second driving mode is set in which the converter 160 includes one ADC 161 and one MUX 162. The MUX 162 may be connected to each circuit in which detectors are integrated for each column. For example, the MUX 162 may be connected to a circuit in which a first column of detectors PD1 and PD3 are integrated, and a circuit in which a second column of detectors PD2 and PD4 are integrated, and may selectively output an optical signal, input from each circuit, to the ADC 161. Further, inputs of each detector may be integrated for each row and may be connected to the detector driver 150. For example, a circuit in which inputs of a first row of the detectors PD1 and PD2 are integrated and a circuit in which inputs of a second row of the detectors PD3 and PD4 are integrated may be connected to the detector driver 150. As described above, the second driving mode is set such that outputs of any one row of the detectors, selected by the detector driver 150, may be input to the MUX 162 at the same time, and an optical signal selected by the MUX 162 may be output to the ADC 161.

Figure 4C:
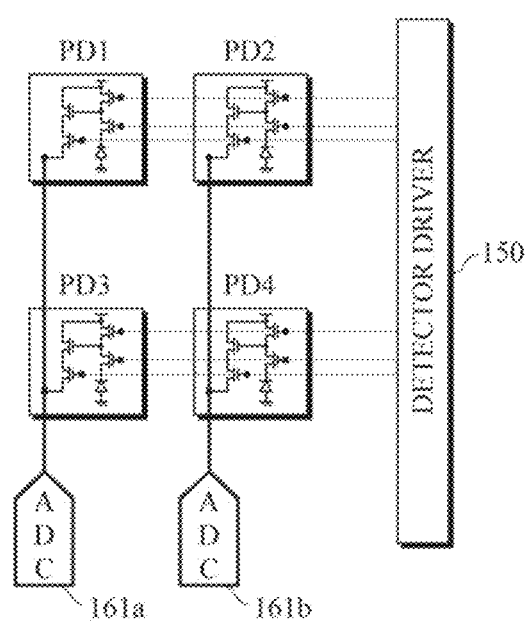

Referring to FIG. 4C, a third driving mode is set such that the converter 160 may include a plurality of ADCs 161a and 161b. The plurality of ADCs 161a and 161b may be respectively connected to each circuit in which outputs of detectors are integrated for each column. For example, the ADC 161a in the first column may be connected to a circuit in which outputs of the first column of the detectors PD1 and PD3 are integrated, and the ADC 161b in the second column may be connected to a circuit in which outputs of the second column of the detectors PD2 and PD4 are integrated. In addition, inputs of each detector may be integrated for each row, and may be connected to the detector driver 150. For example, a circuit in which inputs of the first row of the detectors PD1 and PD2 are integrated and a circuit in which inputs of the second row of the detectors PD3 and PD4 are integrated may be connected to the detector driver 150. As described above, the third driving mode is set such that the outputs of any one row of detectors, selected by the detector driver 150, may be input to each of the ADCs 161a and 161b at the same time.

Figure 4D:
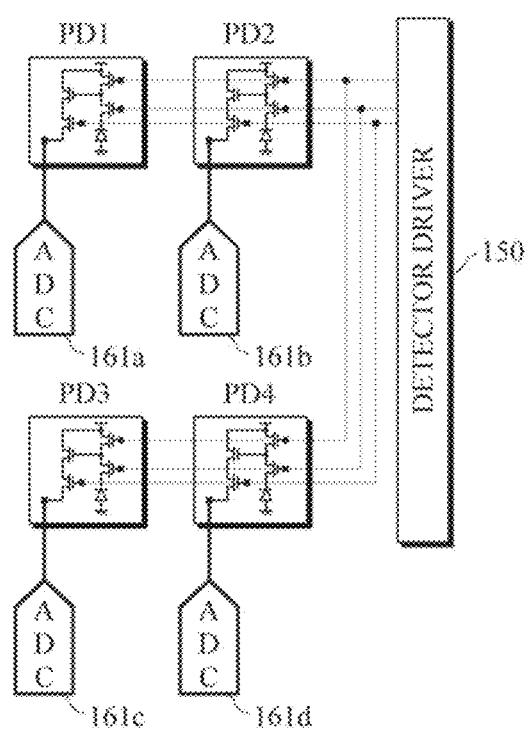

Referring to FIG. 4D, a fourth driving mode is set such that the converter 160 includes a plurality of ADCs 161a, 161b, 161c, and 161d, and each of the ADCs 161a, 161b, 161c, and 161d may be connected to the respective outputs of the detectors PD1, PD2, PD3, and PD4 corresponding to the ADCs 161a, 161b, 161c, and 161d. Further, inputs of the detectors PD1, PD2, PD3, and PD4 may be integrated and may be connected to the detector driver 150. As described above, the fourth driving mode is set such that optical signals of all the detectors PD1, PD2, PD3, and PD4 may be output all together to the corresponding ADCs 161a, 161b, 161c, and 161d. In this case, the detector driver 150 may be omitted.

However, the driving mode of the light source and the detector is not limited to the above driving modes illustrated with reference to FIGS. 4A to 4D, and the driving modes may be modified, two or more driving modes may be combined, or various other driving modes may be used. For example, the third driving mode may be modified such that the converter 160 may include only one ADC 161, and each of the circuits, in which the detectors are integrated for each column, may be combined together to be connected to the ADC 161, and inputs of each column of the detectors may be connected independently to the detector driver 150. That is, the driving mode of the detectors may be designed in an optimal manner by adjusting the number of ADCs 161, complexity of circuits, and the like, in consideration of a purpose of use and a size of the display, computing performance of the electronic device, and the like.

FIGS. 5A and 5B are diagrams illustrating examples of driving data configured so that a display operates in a mode for acquiring an optical signal. However, the following examples are intended to assist in understanding of the present disclosure and should not be interpreted as limiting the scope thereof.

FIG. 5A illustrates a display portion having an array of unit pixels including 18 rows and 12 columns. FIG. 5B illustrates various examples of driving data in a second mode or a third mode for acquiring an optical signal. Driving data 1 is an example of driving data for acquiring an optical signal using a pair of a light source (LED) of a 30th unit pixel and a detector (PD) of a 114th unit pixel, in which an optical signal having a single optical path may be acquired.

Driving data 2 is an example of driving data for acquiring a plurality of optical signals using a pair of a light source at any one position 30 and detectors at a plurality of positions 113, 114, and 115, in which optical signals having multiple optical paths may be acquired when the position of the light source is fixed.

Driving data 3 is an example of driving data for acquiring a plurality of optical signals using a pair of light sources at a plurality of positions 30, 31, and 32, and a detector at any one position 114, in which optical signals having multiple optical paths may be acquired when the position of the detector is fixed.

Driving data 4 is an example of driving data for acquiring a plurality of optical signals using pairs of light sources at a plurality of positions 1, 2, 3, 4, 5, and 6 and detectors at a plurality of positions 1, 2, 3, 4, 5, and 6, in which optical signals having multiple optical paths may be acquired at various positions.

Driving data 5 is an example of driving data obtained by combining two or more driving data, for example, the driving data 1 and the driving data 4, in which a plurality of optical signals are acquired by alternately driving the driving data 1 and the driving data 4 in a time-division manner at every sampling time, such that the optical signals may be used for various analysis purposes.

Figure 6:
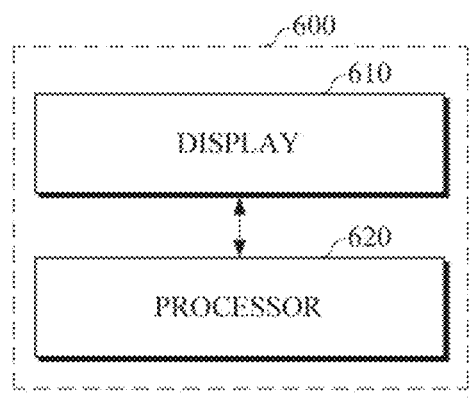
FIG. 6 is a block diagram illustrating an electronic device according to an embodiment.
Figure 7A:
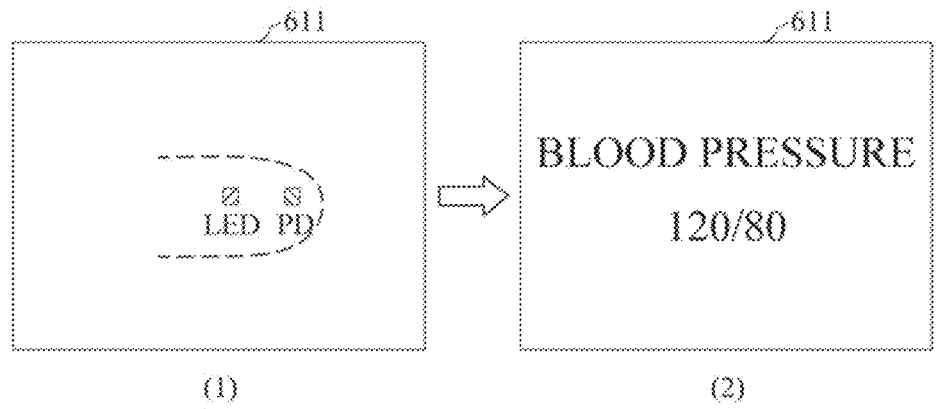
FIGS. 7A and 7B are diagrams explaining examples of an operation method of a display according to an embodiment.
Figure 7B:
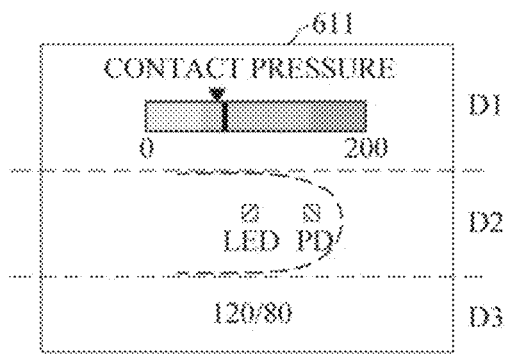

FIG. 6 is a block diagram illustrating an electronic device according to an embodiment of the present disclosure. FIGS. 7A and 7B are diagrams explaining examples of an operation method of a display. FIGS. 8A to 8G are diagrams explaining examples of acquiring an optical signal by a display.

Referring to FIG. 6, the electronic device 600 includes a display 610 and a processor 620.

The display 610 includes a display portion which operates in a first mode for displaying an image, a second mode for acquiring an optical signal, and a third mode for displaying an image and acquiring an optical signal; and a controller which controls the display portion to operate in the first mode, the second mode, or the third mode based on driving data.

The display portion is formed of an array of unit pixels, and each unit pixel may include a light source pixel and a detector pixel. A light source pixel of each unit pixel may include, for example, a plurality of LED pixels for emitting light of different wavelengths. Further, a detector pixel of each unit pixel may include a PD pixel for detecting an optical signal from an object.

In addition, the display 610 may include a control driver which is electrically connected to the display portion and the controller, and drives the display portion according to a corresponding mode. The control driver may include a light source driver and a data driver which are connected to the light source pixel, and a detector driver which is connected to the detector pixel.

Based on driving data corresponding to the first mode being input from the processor 620, the controller may deactivate the detector driver, and may control the light source driver and the data driver. In addition, based on driving data corresponding to the second mode or the third mode being input, the controller may activate the detector driver, and may control the light source driver, the data driver, and the detector driver.

Furthermore, the display 610 may further include a converter which converts the optical signal, acquired according to the second mode or the third mode, into a digital signal, and outputs the signal to the processor 620. As described above, the converter may include one or more ADCs, or one or more MUXs and one or more ADCs.

Examples of the display 610 are described above in detail with reference to FIGS. 1 to 5B, such that a description thereof will be omitted.

The processor 620 processes various function of the electronic device 600. For example, the processor 620 may determine a mode of the display 610 in response to a request related to the display 610. Further, the processor 620 may control the operation of the display 610 by generating driving data according to the determined mode and by transmitting the generated driving data to the controller of the display 610. Examples of the driving data according to each mode are described above.

The processor 620 may set the first mode as a default mode of the display 610, and may change the mode of the display 610 to the second mode or the third mode based on receiving a request for analyzing an object. In addition, based on completing acquisition of the optical signal according to the second mode or the third mode, the processor 620 may automatically change the mode of the display 610 to the first mode.

Based on various image data being processed by the electronic device 600 while the display 610 is maintained in the first mode, the processor 620 may generate driving data including the various image data, and may transmit the generated driving data to the controller of the display 610. In this case, the image data processed by the electronic device 600 may include image data, such as TV content, video/still images which are created and/or reproduced by various applications installed in the electronic device 600, various image data received from an external device which is connected to the electronic device 600 via a wired or wireless communications network, and the like.

Based on receiving a request for analyzing an object using an optical signal, the processor 620 may generate proper driving data to change the mode of the display 610 to the second mode or the third mode. In this case, the request for analyzing an object may include requests for various operations, such as a request for estimating bio-information, a request for fingerprint authentication, a request for document scanning and image scanning, and the like, which may be processed using an optical signal.

For example, the processor 620 may determine a mode for acquiring an optical signal based on a user's request, a type of the electronic device 600, a type of a request for analyzing an object, a size and/or performance of the display 610, and the like. In this case, a user may designate the second mode as a mode of the display 610, so that the optical signal may be acquired using the entire area of the display 610 to estimate bio-information more accurately. Alternatively, a user may designate the third mode as a mode of the display 610, so that while the user continuously watches an image, which is currently viewed by the user, in one area of the display 610, the optical signal may be acquired in the other area of the display 610.

In another example, a mode of the display 610 for acquiring an optical signal may be pre-defined based on a type of a request for analyzing an object, a size and/or performance of the display 610, and the like. Based on receiving the request for analyzing an object, the processor 620 may determine the pre-defined mode as the mode of the display 610 for acquiring an optical signal. For example, in response to the request for analyzing an object, the processor 620 may define the third mode as the mode of the display 610, and if the performance of the display 610 is relatively low or the display 610 has a small size, the processor 620 may define the second mode as the mode of the display 610. However, the mode of the display 610 is not limited thereto.

Based on the display 610 operating in the second mode or the third mode to acquire an optical signal from an object, the processor 620 may process a user's request by analyzing the object based on the optical signal. Based on completing the analysis of the object, the processor 620 may generate an analysis result of the object as image data, and may generate proper driving data and transmit the generated driving data to the controller of the display 610, so that the display 610 may display the image data of the analysis result in the first mode or the third mode.

For example, referring to FIG. 7A, based on determining the second mode as the mode of the display 610 in response to the request for acquiring an optical signal, the processor 620 may generate driving data for driving a predetermined light source LED and a detector PD as illustrated in (1), and may transmit the generated data to the controller of the display 610. Further, based on the optical signal being acquired when the object is in contact with the display portion 611, the processor 620 may estimate blood pressure by using the optical signal.

In addition, before generating the driving data for acquiring an optical signal, the processor 620 may generate driving data for operating the display 610 in the first mode and transmit the data to the controller of the display 610, so that the display 610 in the first mode may display guide information for acquiring an optical signal, e.g., information including a contact position, a contact state, a contact pressure, and the like. Further, based on a predetermined period of time elapsing, the processor 620 may generate driving data for operating the display 610 in the second mode for acquiring the optical signal, and may transmit the generated data to the controller of the display 610.

Furthermore, as illustrated in (2), based on completing acquisition of the optical signal or estimation of blood pressure, the processor 620 generate driving data to change the mode of the display 610 to the first mode, and to output a blood pressure estimation result to the display portion 611.

Referring to FIG. 7B, based on determining the third mode as the mode of the display 610, the processor 620 may generate driving data to control the display 610 to output the guide information for acquiring the optical signal and/or a processing result in first areas D1 and D3 of the display portion 611, and information associated with a light source LED and a detector PD to be driven for acquiring the optical signal in a second area D2. As illustrated in FIG. 7B, the first areas D1 and D3 may be divided into two or more areas, so that information for visually guiding contact pressure may be displayed in any one area D1, and a processing result during or after acquisition of the optical signal in the second area D2 may be displayed in the other area D3. For example, the processor 620 may display a text, such as "press more strongly," so that a user may increase contact pressure while the optical signal is acquired, and based on completing estimation of blood pressure, the processor 620 may display an estimated blood pressure value as illustrated in FIG. 7B.

FIGS. 8A to 8G illustrate examples of driving a pair of a light source and a detector when the display 610 operates in the second mode or the third mode to acquire an optical signal, in which a display area of the display 610 has 10 rows and 10 columns. In this case, the display area indicates an entire area in the second mode or an area for acquiring an optical signal in the third mode.

The display 610 may drive the pair of the light source and the detector based on the driving data generated by the processor 620, and may acquire, e.g., a first optical signal for estimating blood pressure.

Figure 8A:
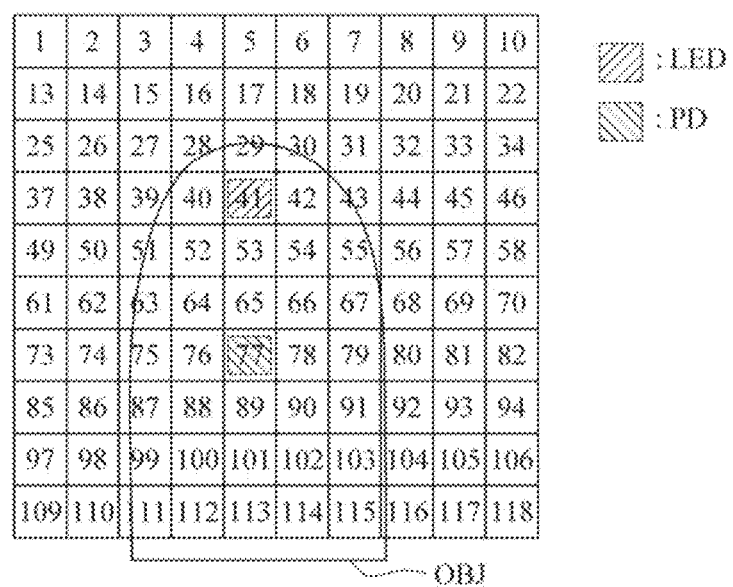
FIGS. 8A to 8G are diagrams explaining examples of acquiring an optical signal by a display according to an embodiment.

For example, referring to FIG. 8A, the display 610 may drive a pair of a light source 41 and a detector 77, to acquire the first optical signal from the object OBJ. In this case, the pair of the light source 41 and the detector 77 to be driven may be predetermined.

Figure 8B:
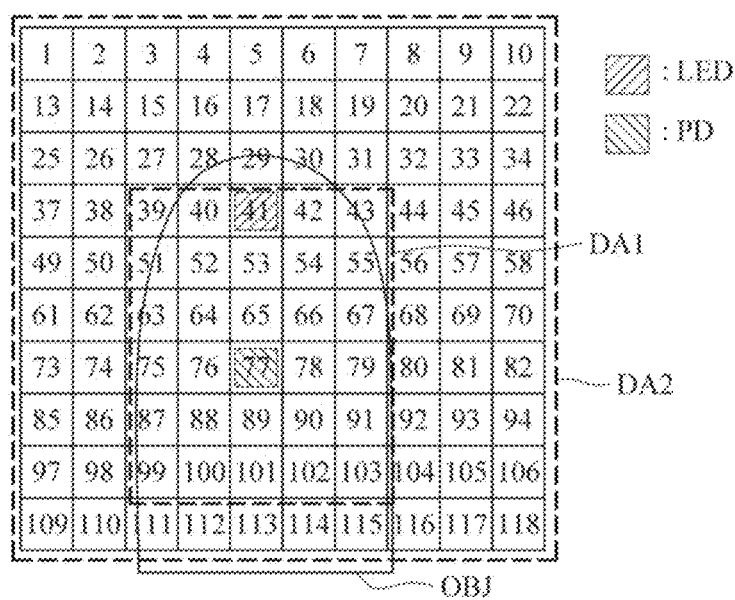

In another example, referring to FIG. 8B, while the display 610 acquires the first optical signal by driving the pair of the light source 41 and the detector 77 in the first area DA1 being in contact with the object OBJ, the display 610 may acquire a plurality of second optical signals by driving pairs of a plurality of light sources and detectors in the second area DA2. In this case, the first area DA1 and the second area DA2 may be predetermined. While driving the pairs of the plurality of light source sand detectors in the second area DA2, the display 610 may continuously drive the pair of the light source 41 and the detector 77 for a predetermined period of time or may sequentially drive the pair of the light source 41 and the detector 77 in a time-division manner.

The pairs of the plurality of light sources and detectors in the second area DA2 may be predetermined to be a combination of light sources and detectors of the entire unit pixels in the second area DA2. For example, a light source and a detector of the same unit pixel may be combined as a pair, or a light source of a first unit pixel and a detector of a second unit pixel, which is spaced apart from the first unit pixel by a predetermined distance, may be combined as a pair. However, the combination is not limited thereto, and various unit pixels may be combined.

Alternatively, the pairs of the plurality of light sources and detectors in the second area DA2 may be predetermined to be a combination of light sources and detectors of some of the unit pixels selected in the second area DA2. For example, unit pixels to be selected may be predetermined based on the performance of the electronic device 600, the performance of the display 610, the purpose of analysis of the optical signal, the speed required for analyzing the optical signal, and the like. For example, unit pixels may be selected by considering a predetermined row spacing, such as a first row, a third row, a fifth row, and the like, and/or a predetermined column spacing, such as a first column, a third column, a fifth column, and the like. In addition, the unit pixels may be selected diagonally or crosswise, but are not limited thereto. Further, a pair of a light source and a detector to be driven at the same time may be formed as a pair of a light source and a detector of each unit pixel or a pair of a light source and a detector of two unit pixels, which are spaced apart from each other.

The display 610 may drive all or selected pairs of the plurality of light sources and detectors of the second area DA2 in a predetermined pattern. In this case, the predetermined pattern may include sequential driving in a row direction or a column direction, simultaneous driving one or more times, driving in a circular shape, a square shape, and the like, in a clockwise or counter-clockwise direction, or sequential and/or simultaneous driving by extending from the inside out or vice versa, but is not limited thereto.

Figure 8C:
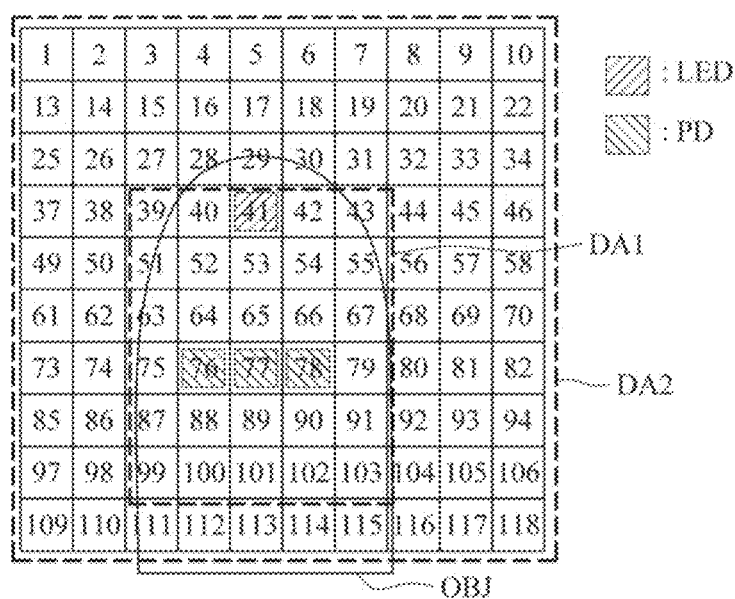

Referring to FIG. 8C, while driving the pairs of the plurality of light sources and detectors in the second area DA2 in various manners, the display 610 may simultaneously or sequentially drive one light source 41 and a plurality of detectors 76, 77, and 78 in the first area DA1, to acquire a plurality of first optical signals from the object OBJ.

Figure 8D:
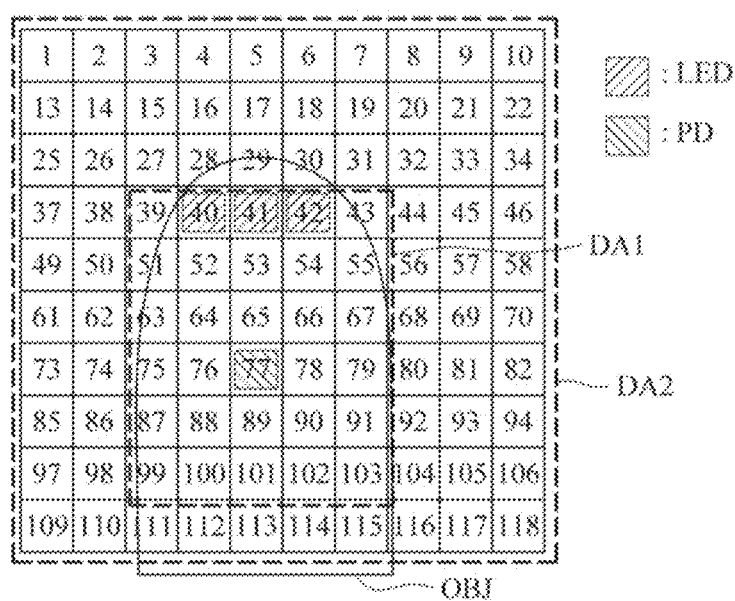

Referring to FIG. 8D, while driving the pairs of the plurality of light sources and detectors in the second area DA2 in various manners as described above, the display 610 may simultaneously or sequentially drive a plurality of light sources 40, 41, and 42 and one detector 77 in the first area DA1, to acquire one or more first optical signals from the object OBJ.

Figure 8E:
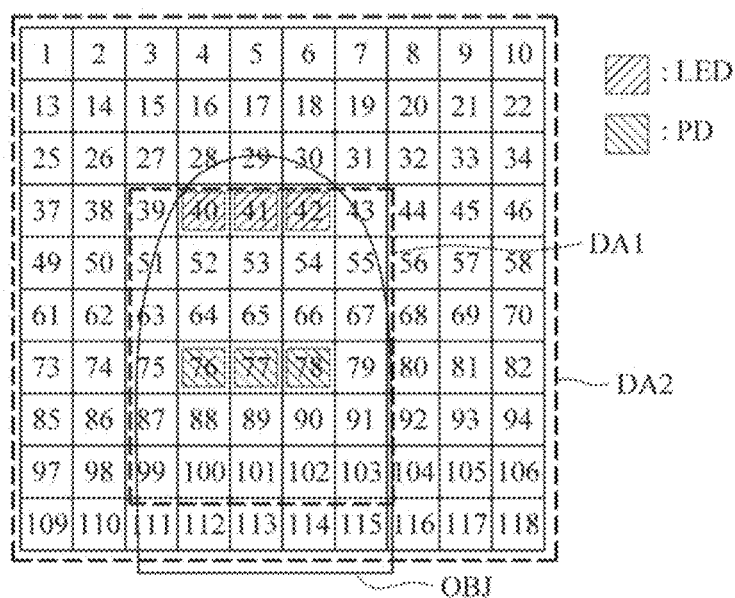

Referring to FIG. 8E, while driving the pairs of the plurality of light sources and detectors in the second area DA2 in various manners as described above, the display 610 may simultaneously or sequentially drive a plurality of light sources 40, 41 and 42 and a plurality of detectors 76, 77, and 78 in the first area DA1, to acquire a plurality of first optical signals from the object OBJ.

Figure 8F:
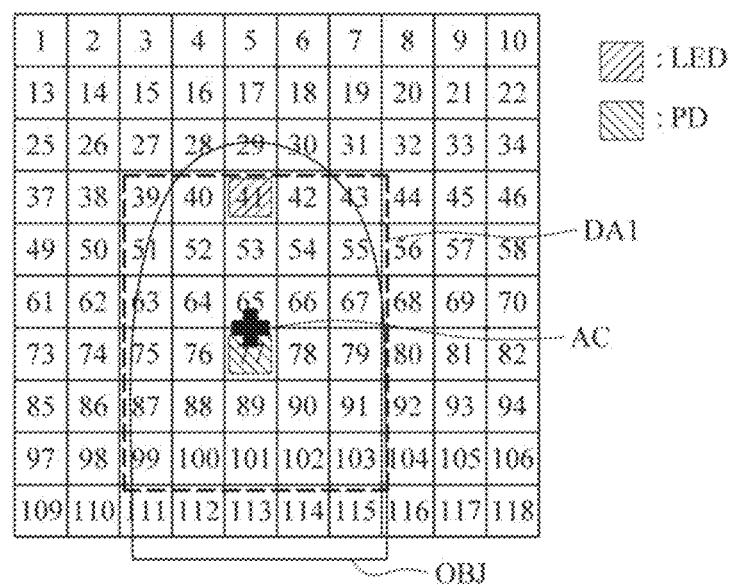
Figure 8G:
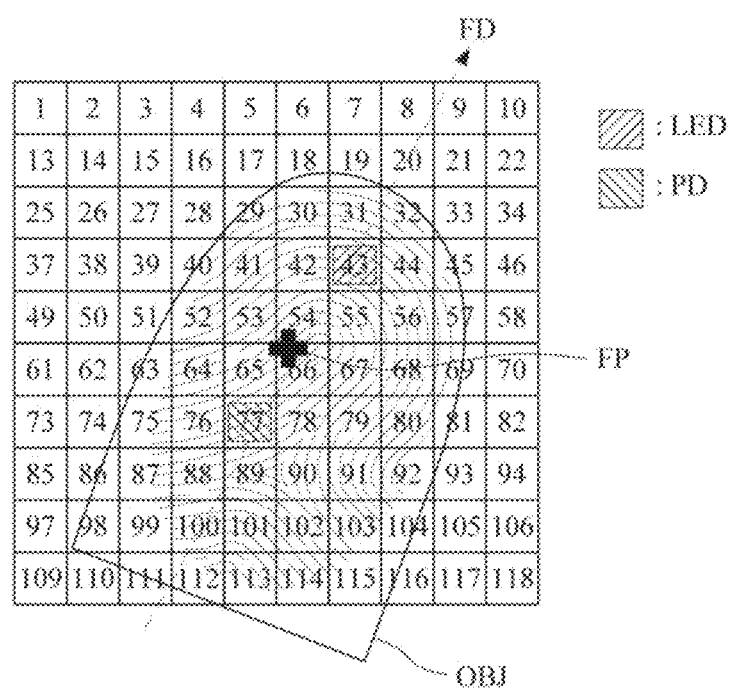

Referring to FIGS. 8F and 8G, based on receiving a request for acquiring an optical signal, the processor 620 may determine one or more light sources and detectors to be driven based on a predetermined reference point of the first area.

For example, as illustrated in FIG. 8F, the predetermined reference point of the first area DA1 may be a center point of the first area DA1. The processor 620 may determine the light source 41 and the detector 77, which are positioned at a predetermined distance from the center point of the first area DA1, as the light source and the detector for acquiring the first optical signal. In this case, one or more light sources and detectors may be determined as illustrated in FIGS. 8C to 8E. The processor 620 may perform calibration to guide the object OBJ to touch the display 610 a plurality of number of times, and may analyze a contact pattern of the object OBJ to determine, for each user, an optimal size of the first area DA1 and an optimal distance from the center point AC of the first area to the light source and the detector.

In another example, as illustrated in FIG. 8G, the processor 620 may obtain a fingerprint feature point FP as a predetermined reference point based on fingerprint data obtained by the contact of the object OBJ, and may determine the light source and the detector for acquiring the first optical signal based on the obtained fingerprint feature point FP. In this case, the processor 620 may obtain a fingerprint direction FD, and may determine the light source and the detector, which are positioned at a predetermined distance from the fingerprint feature point FP in the fingerprint direction FD. In this case, the fingerprint data may be obtained based on the distribution of an amount of light received by the display 610 being in contact with the object OBJ, or may be obtained by using a fingerprint sensor which will be described below.

As described above, the processor 620 may estimate bio-information, may provide fingerprint authentication, may perform document scanning and image scanning, and the like, based on the first optical signal. In this case, based on obtaining a plurality of first optical signals, the processor 620 may process various requests by selecting any one of the plurality of first optical signals or by combining two or more of the first optical signals.

In addition, as described above, based on obtaining a plurality of second optical signals in the second area along with the first optical signal, the processor 620 may correct the first optical signal based on the second optical signals. For example, referring to FIG. 8B, as compared to a 77th unit pixel for acquiring the first optical signal, if the object OBJ is in more appropriate contact with a 76th unit pixel which is located on the left side of the 77th unit pixel, the processor 620 may correct the first optical signal of the 77th unit pixel based on the second optical signal detected in the 76th unit pixel. For example, the processor 620 may correct the first optical signal of the 77th unit pixel by using various pre-defined correction equations, such as averaging amplitudes at each time point of the optical signals of the 76th and the 77th unit pixels. Here, the example of correcting the first optical signal using only the 76th unit pixel is described above, but the correction is not limited thereto, and the first optical signal may be corrected by selecting a plurality of second optical signals, detected in a relatively sufficient contact state, and based on the selected plurality of second optical signals.

Alternatively, the processor 620 may evaluate reliability of the first optical signal based on the plurality of second optical signals. For example, if a feature point, e.g., a maximum amplitude, which is extracted from each optical signal, gradually increases further away from the 77th unit pixel, the processor 620 may determine that reliability of the first optical signal is not high, and may change the mode of the display 610 to the first mode or the third mode to guide the object to re-contact the display 610. In this case, criteria for determining reliability are not limited thereto.

Figure 9:
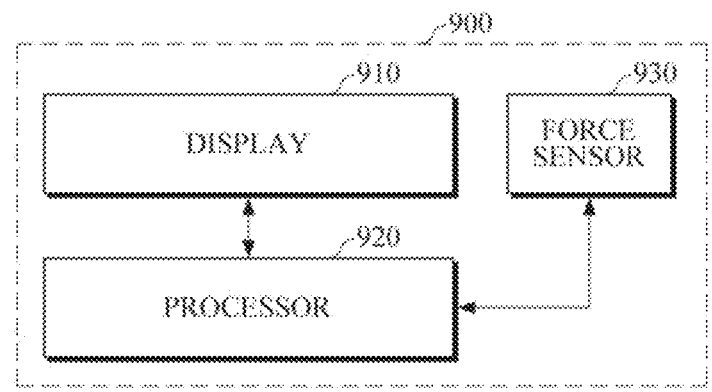
FIG. 9 is a block diagram illustrating an electronic device according to an embodiment.
Figure 10A:
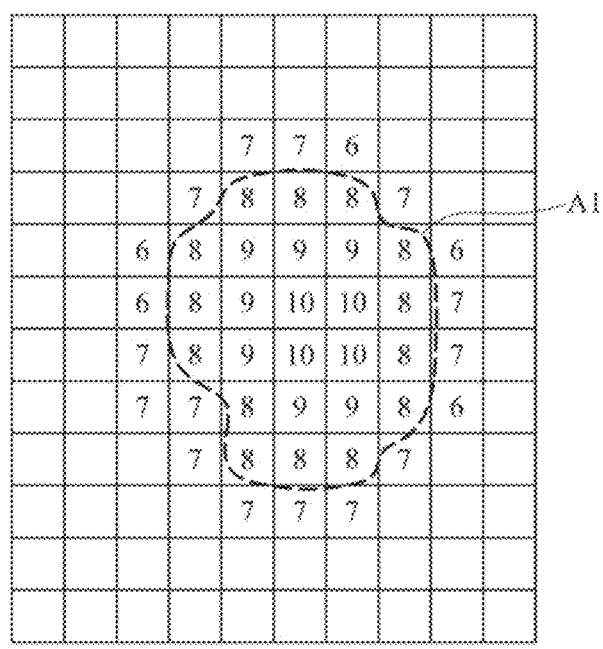
FIGS. 10A to 10C are diagrams explaining examples of estimating blood pressure using oscillometry according to an embodiment.
Figure 10B:
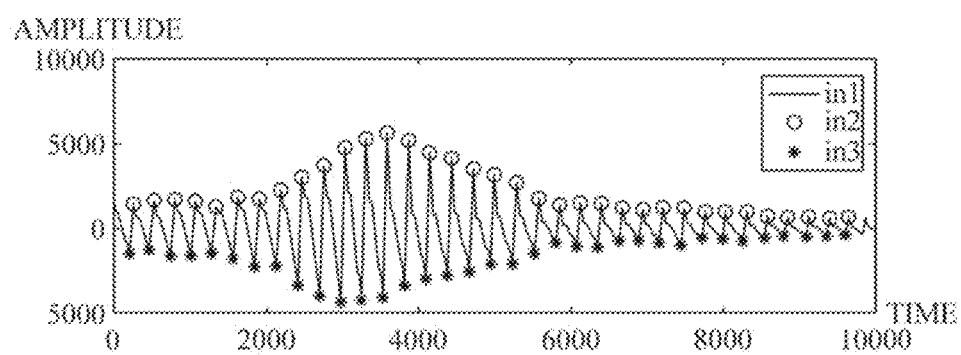
Figure 10C:
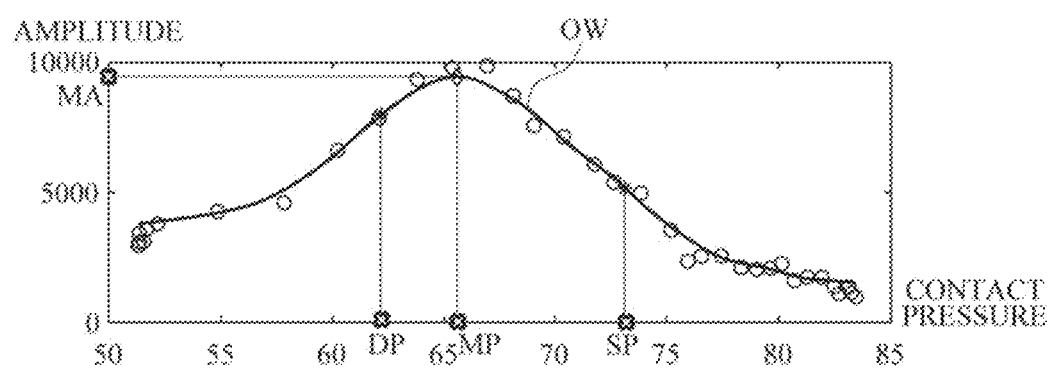

FIG. 9 is a block diagram illustrating an electronic device according to another embodiment of the present disclosure. FIGS. 10A to 10C are diagrams explaining examples of estimating blood pressure using oscillometry.

Among various functions for analyzing an object based on an optical signal by the electronic device 900, a function of estimating bio-information will be described below with reference to FIGS. 9 to 10C. In this case, bio-information may include one or more of blood pressure, vascular age, arterial stiffness, aortic pressure waveform, vascular compliance, stress index, fatigue level, skin elasticity, skin age, triglyceride, cholesterol, blood glucose, and antioxidant index, but is not limited thereto.

As illustrated in FIG. 9, the electronic device 900 according to an embodiment of the present disclosure includes a display 910, a processor 920, and a force sensor 930. The display 910 and the processor 920 are described above in detail with reference to the above embodiments.

Based on receiving a request for estimating bio-information, the processor 920 may generate driving data for changing the mode of the display 910 to the second mode or the third mode, and may transmit the driving data to the display 910.

For example, based on determining the second mode, the processor 920 may generate first driving data and transmit the data to the display 910, so that the display 910 may first operate in the first mode to display guide information for guiding a user to acquire an optical signal. In this case, the guide information may be image data which visually displays a contact position and/or contact pressure of an object (e.g., a finger), and the like. Then, based on a predetermined period of time elapsing after the guide information is displayed on the display 910, the processor 920 may generate second driving data and transmit the data to the display 910, so that the display 910 may operate in the second mode to acquire an optical signal from the object.

In another example, based on determining the third mode, the processor 920 may generate driving data and transmit the data to the display 910, so that the display 910 may operate in the third mode to display guide information for acquiring an optical signal and/or a bio-information estimation result in the first area of the display 910, and to acquire the optical signal in the second area.

Furthermore, based on determining the second mode or the third mode, the processor 920 may generate the first driving data and transmit the data to the display 910, so that the display 910 may first operate in the first mode to acquire a first optical signal for determining a contact position of the object; and based on the first optical signal being acquired, the processor 920 may analyze the contact position of the object based on the first optical signal. In addition, the processor 920 may determine a light source and a detector to be driven to acquire a second optical signal for estimating bio-information based on the analyzed contact position, and may generate second driving data including information on the determined light source and detector and transmit the driving data to the display 910.

For example, by generating the driving data 4 of FIG. 5B described above as the first driving data, the processor 920 may detect an amount of light produced by the contact of the object in the entire area of the display portion, and may track a region of unit pixels, having an amount of light greater than or equal to a predetermined threshold, as a contact position of the object. Further, based on tracking, if a square region, having unit pixels 17, 19, 137, and 139 of FIG. 5A as vertices, is determined as a contact position of the object, the processor 720 may generate the driving data 1 of FIG. 5B as the second driving data.

The force sensor 930 may be disposed below the display 910, and based on a user touching the display 910 with an object and applying force thereto, the force sensor 930 may measure the contact force. In order to change the intensity of an optical signal for a predetermined period of time, the user may gradually increase the pressing force while touching the display 910 with a finger, or may gradually decrease the pressing force when touching the display 910 with a force greater than or equal to a predetermined threshold.

Based on receiving the contact force measured by the force sensor 930 and the optical signal acquired by the display 910, the processor 920 may estimate bio-information based on the contact force and the optical signal.

For example, FIG. 10A illustrates a portion of the amount of light received by the detector pixel of the display 910 when the object touches the display 910 and gradually increases pressure. In this case, the amount of light of the detector pixel may be a magnitude of capacitance. The processor 920 may obtain a contact area between the object and the display portion based on the magnitude of the amount of light of the detector pixel.

For example, the processor 920 may determine successive regions, having an amount of light greater than or equal to a predetermined threshold value (8 in FIG. 10A), as a region of interest AI, and may obtain, as a contact area, a value by multiplying the number of unit pixels in the determined region of interest AI by the size of each unit pixel. In another example, the processor 920 may obtain a contact area based on a correlation between a statistical value (e.g., sum total, mean value, median value, maximum value, minimum value, etc.) of the amounts of light of pixels, included in the region of interest, and a contact area. Generally, when a user touches the display portion with a finger and gradually increases a pressing force, a contact area increases during a predetermined interval, and the amount of light of pixels in a region touched by the finger at this time also increases. Accordingly, a constant correlation between a statistical value of the amounts of light and a contact area may be pre-defined by linear/non-linear functions.

The processor 920 may determine a contact area of the object by generating optimal (or improved) first driving data, e.g., the driving data 5 of FIG. 5B, for measuring a contact area. Based on determining the contact area, the processor 920 may generate second driving data to acquire an optical signal for estimating bio-information, and may transmit the second driving data to the display 910.

However, the electronic device 900 is not limited thereto, and may further include a contact area sensor, which is mounted above or below the display 910, and may also obtain a contact area by using the contact area sensor.

Based on obtaining the contact area, the processor 920 may obtain contact pressure based on the obtained contact area and the contact force measured by the force sensor 930. For example, the processor 920 may obtain the contact pressure by dividing the contact force by the contact area. Based on obtaining the contact pressure, the processor 920 may estimate bio-information using oscillometry based on the contact pressure and an amplitude of the optical signal.

For example, FIG. 10B illustrates an optical signal measured by the display 910, e.g., a pulse wave signal, when a user gradually increases contact pressure while touching the display 910 with a finger. As illustrated in FIG. 10B, when the user gradually increases a pressing force while touching the display 910 with the finger, the amplitude of the optical signal also shows a gradually increasing trend during a predetermined period of time. The processor 920 may extract a peak-to-peak point of the pulse wave signal waveform by subtracting a negative (−) amplitude value in3 from a positive (+) amplitude value in2 of a waveform envelope in1 at each measurement time, and may obtain the oscillometric envelope OW by plotting the peak-to-peak amplitude at each measurement time against the contact pressure value at the same time point, as illustrated in FIG. 10C.

Referring to FIG. 10C, the processor 920 may obtain features for estimating bio-information, e.g., blood pressure, from the obtained oscillometric envelope OW. The processor 920 may obtain, as features, an amplitude value MA at a maximum peak point, a contact pressure value MP at the maximum peak point, contact pressure values SP and DP at the right and left points corresponding to a predetermined ratio (e.g., 0.5 to 0.7) to the amplitude value MA of the maximum peak point, and the like from the oscillometric envelope OW. However, the features are not limited thereto, and by analyzing the waveform of the optical signal, the processor 920 may obtain additional features, such as a maximum amplitude value, a time value corresponding to the maximum amplitude value, time and amplitude values at points related to a propagation wave and a reflection wave, a combination of the obtained values, and the like.

Based on extracting the features, the processor 920 may estimate bio-information by applying a pre-defined bio-information estimation model. The bio-information estimation model may be expressed in the form of various linear or non-linear combination functions, such as addition, subtraction, division, multiplication, logarithmic value, regression equation, and the like, with no specific limitation. For example, the following Equation 1 represents a simple linear function.

$$y = ax + b \quad \text{[Equation 1]}$$

Herein, y denotes an estimated bio-information value to be obtained; x denotes an extracted feature value; and a and b are values pre-obtained by preprocessing, and may be defined differently according to types of bio-information and user characteristics. For example, by using the above Equation 1 which is defined for each of mean arterial pressure (MAP), diastolic blood pressure (DBP), and systolic blood pressure (SBP), the processor 920 may independently estimate each blood pressure. For example, by inputting the extracted feature values MP, DP, and SP into the function, which is defined for each of the feature values, the processor 920 may obtain MAP, SBP, and DBP independently.

Figure 11:
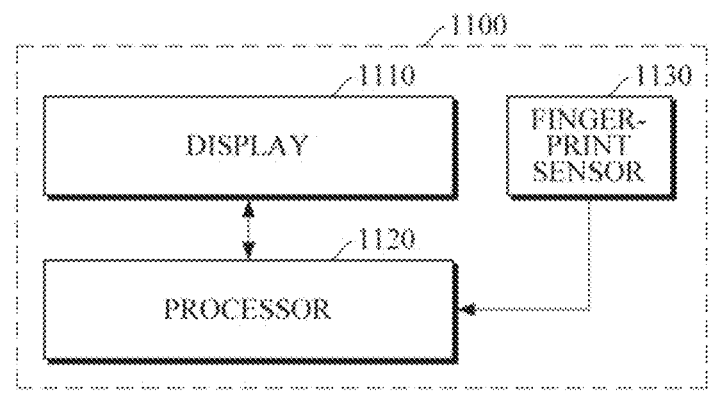
FIG. 11 is a block diagram illustrating an electronic device according to an embodiment.
Figure 12:
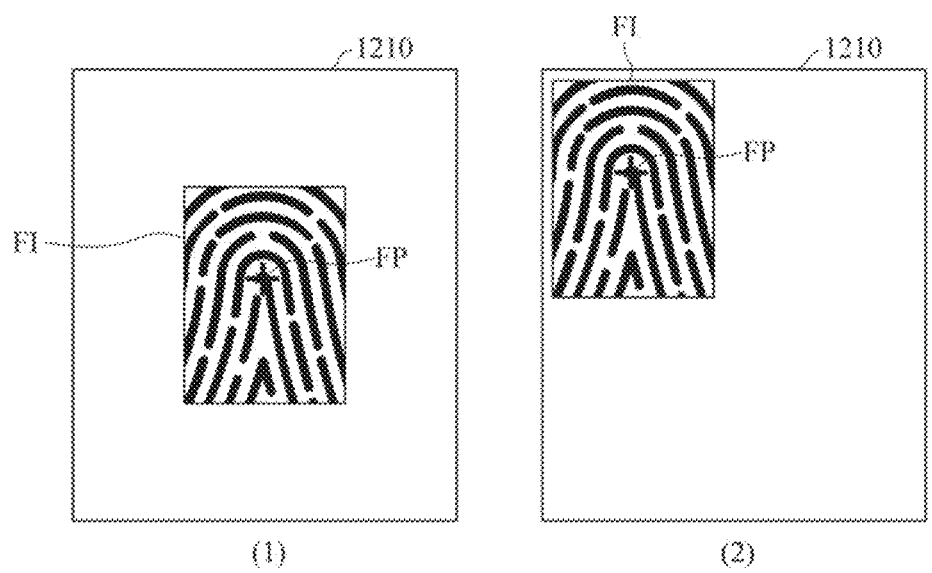
FIG. 12 is a diagram explaining an example of determining a contact state of an object according to an embodiment.

FIG. 11 is a block diagram illustrating an electronic device according to yet another embodiment of the present disclosure. FIG. 12 is a diagram explaining an example of determining a contact state of an object by fingerprint detection.

Referring to FIG. 11, an electronic device 1100 according to an embodiment includes a display 1110, a processor 1120, and a fingerprint sensor 1130. Various functions of the aforementioned electronic devices 600 and 900 may be performed by the electronic device 1100 according to the embodiment of the present disclosure. The electronic device 1100 may further include the force sensor described above with reference to FIG. 9.

The embodiments of the display 1110 and the processor 1120 are described above, such that the following description will be given based on non-overlapping functions thereof.

A fingerprint sensor 1130 may be disposed above or below the display 1110. The fingerprint sensor 1130 may be an optical fingerprint sensor or a capacitive fingerprint sensor. The fingerprint sensor 1130 may obtain fingerprint data based on a user touching the sensor with an object to acquire an optical signal. Here, the fingerprint data may include a fingerprint image of a finger, and/or a contact image of an object other than a finger.

FIG. 12 illustrates a fingerprint image of a finger, in which (1) shows a state in which the fingerprint is in proper contact with the center of the display portion, and (2) shows a state in which the fingerprint leans to one side of the display portion. For example, based on the fingerprint image FI being obtained, the processor 1120 may obtain a fingerprint feature point FP, and may generate driving data for driving a light source and a detector which are located within a predetermined range from the obtained fingerprint feature point FP. In another example, if the fingerprint feature point FP leans too much to one side as shown in (2) of FIG. 12, the processor 1120 may display, through the display 1110, guide information for guiding a user to touch the sensor with the object again, instead of driving a light source and a detector which are located near the fingerprint feature point FP.

In addition, the fingerprint sensor 1130 may be an ultrasonic sensor using ultrasonic waves. Based on the user's object coming into contact with the sensor, the ultrasonic sensor may detect additional information, e.g., contact load distribution, an ultrasonic pulse wave signal, and/or a blood flow signal, and the like, in addition to the fingerprint. The processor 1120 may estimate bio-information by using the optical signal, obtained through the display 1110, and the additional information obtained by the ultrasonic sensor.

Figure 13:
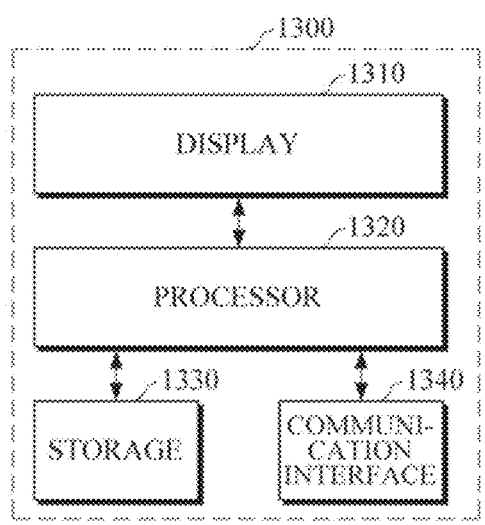
FIG. 13 is a block diagram illustrating an electronic device according to an embodiment.

FIG. 13 is a block diagram illustrating an electronic device according to still another embodiment of the present disclosure.

Referring to FIG. 13, the electronic device 1300 according to an embodiment of the present disclosure includes a display 1310, a processor 1320, a storage 1330, and a communication interface 1340. Various functions of the aforementioned electronic devices 600, 900 and 1100 may be performed by the electronic device 1100 according to the embodiment of the present disclosure. Accordingly, the electronic device 1300 may further include the force sensor of FIG. 9 and the fingerprint sensor of FIG. 11.

The display 1310 may operate in the first mode or the third mode under the control of the processor 1320, to output various processing results of the processor 1320. For example, the display 1310 may visually output an estimated bio-information value and/or guide information. Further, if the estimated bio-information value falls outside of a normal range, the display 1310 may output warning information in various manners, such as highlighting an abnormal value in red and the like, displaying the abnormal value along with a normal range, outputting a voice warning message, adjusting a vibration intensity, and the like.

In addition, the electronic device 1300 may include a non-visual output module, such as a speaker module, a haptic module, or the like, in addition to the display 1310, and may non-visually output the information by voice, vibrations, tactile sensation, and the like by using such non-visual output modules.

The storage 1330 may store a processing result of the processor 1320. Further, the storage 1330 may store a variety of reference information for analyzing an object including estimation of bio-information. For example, the reference information may include user characteristic information such as a user's age, sex, health condition, and the like. In addition, the reference information may include a variety of information such as a bio-information estimation model, criteria for estimating bio-information, criteria for changing the mode of the display, and the like, but is not limited thereto.

In this case, the storage 1330 may include at least one storage medium of a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), an electrically erasable programmable ROM (EEPROM), a programmable ROM (PROM), a magnetic memory, a magnetic disk, and an optical disk, and the like, but is not limited thereto.

The communication interface 1340 may communicate with an external device by using wired or wireless communication techniques under the control of the processor 1320, and may transmit and receive various data to and from the external device. For example, the communication interface 1340 may transmit a bio-information estimation result to the external device, and may receive, from the external device, a variety of reference information required for estimating bio-information. In this case, the external device may include a cuff-type blood pressure measuring device and an information processing device such as a smartphone, a tablet PC, a desktop computer, a laptop computer, and the like.

In this case, examples of the communication techniques may include Bluetooth communication, Bluetooth low energy (BLE) communication, near field communication (NFC), WLAN communication, Zigbee communication, Infrared Data Association (IrDA) communication, wireless fidelity (Wi-Fi) Direct (WFD) communication, Ultra-Wideband (UWB) communication, Ant+ communication, Wi-Fi communication, Radio Frequency Identification (RFID) communication, third generation (3G) communication, fourth generation (4G) communication, fifth generation (5G) communication, and the like. However, this is merely exemplary and is not intended to be limiting.

FIG. 14 is a flowchart illustrating a method of estimating bio-information by an electronic device according to an embodiment of the present disclosure. The method of FIG. 14 is an example of the method of estimating bio-information by the electronic devices of FIGS. 6, 9, 11, and 13, which are described above in detail, and thus will be briefly described below.

The electronic device may receive a request related to the display in operation 1410. The request related to the display may be received from a user or an external device. For convenience of explanation, the following description will be given by dividing the request related to the display into a request for estimating bio-information to acquire an optical signal and other requests for image display.

Then, the electronic device may determine the mode of the display based on the received request related to the display in operation 1420. For example, based on receiving a request for image display in operation 1410, the electronic device may determine a first mode, which is a default mode, as the mode of the display. Alternatively, based on receiving a request for estimating bio-information in operation 1410, the electronic device may determine either the second mode or the third mode as the mode of the display according to a user's request or predetermined criteria. In this case, the predetermined criteria may be set based on the performance and type of the electronic device, the performance and/or type of the display, and the like. For example, if the display has a small size, the electronic device may determine the second mode for acquiring only an optical signal, and if the display has a large size, the electronic device may determine the third mode for simultaneously displaying an image and acquiring an optical signal.

Subsequently, based on determining the first mode in operation 1420, the electronic device may change the mode of the display to the first mode in operation 1431, and may display image data on the display in operation 1432.

Based on determining the second mode in operation 1420, the electronic device may change the mode of the display to the second mode in operation 1441, and may measure an optical signal from an object in operation 1442. In this case, while maintaining the display in the first mode before changing the mode of the display to the second mode, the electronic device may display guide information for measuring a pulse wave signal, and based on a predetermined period of time elapsing, the electronic device may change the mode to the second mode to measure the optical signal. Based on determining the third mode in operation 1420, the electronic device may change the mode of the display to the third mode in operation 1451, and may display image data, including the guide information, in one area of the display and may measure the optical signal in the other area of the display in operation 1452.

Furthermore, in the acquiring of the optical signal in the second mode and the third mode in operation 1442 and operation 1452, the electronic device may acquire the first optical signal for estimating bio-information by driving pairs of one or more light sources and detectors in the first area which is touched by the object. In this case, by driving pairs of a plurality of light sources and detectors in the second area which includes the first area, the electronic device may acquire the first optical signal while acquiring the second optical signal.

Then, the electronic device may estimate bio-information in operation 1460 based on the first optical signal measured in operation 1442 and operation 1452. Based on acquiring a plurality of second optical signals along with the first optical signal in operation 1442 and operation 1452, the electronic device may correct the first optical signal based on the second optical signals, and may estimate bio-information based on the corrected first optical signal.

The example embodiments present disclosure can be implemented by computer-readable code written on a non-transitory computer-readable medium, and executed by a processor. The non-transitory computer-readable medium may be any type of recording device in which data is stored in a computer-readable manner.

Examples of the non-transitory computer-readable medium include a ROM, a RAM, a CD-ROM, a magnetic tape, a floppy disc, an optical data storage, and a carrier wave (e.g., data transmission through the Internet). The non-transitory computer-readable medium can be distributed over a plurality of computer systems connected to a network so that computer-readable code is written thereto and executed therefrom in a decentralized manner. Functional programs, codes, and code segments for implementing the present disclosure can be readily deduced by programmers of ordinary skill in the art, to which the disclosure pertains.

The present disclosure has been described herein with regard to various embodiments. However, it will be obvious to those skilled in the art that various changes and modifications can be made without departing from the scope of the present disclosure. Thus, it is clear that the above-described embodiments are illustrative in all aspects and are not intended to limit the present disclosure.

What is claimed is:

1. A display comprising:
    a display portion formed of an array of unit pixels that each respectively include a light source pixel and a detector pixel;
    a control driver including a light source driver and a data driver which are respectively connected to each light source pixel, and a detector driver which is connected to each detector pixel;
    a controller configured to control the control driver to operate the display portion in a first mode, a second mode, and a third mode that are each different from each other; and
    a converter configured to be selectively activated by the controller based on the display portion operating in the second mode or the third mode, receive an optical signal from detector pixels of the display portion, and convert the optical signal into a digital signal,
    wherein the converter comprises an analog-digital converter (ADC) connected to outputs of the detector pixels, and at least a portion of inputs of the detector pixels are connected to the detector driver independently of another portion of the inputs of the detector pixels.

2. The display of claim 1, wherein:
the light source pixel includes one or more light emitting diode (LED) pixels which emit light of one or more wavelengths; and
the detector pixel includes a photodiode (PD) pixel which receives light scattered or reflected from an object, and converts the received light into an electric signal.

3. The display of claim 2, wherein:
each of the one or more LED pixels has a 2-transistor 1-capacitor (2T1C) structure; and
the PD pixel has a 4-transistor (4T) structure or a 3-transistor (3T) structure.

4. The display of claim 1, wherein in response to an input of driving data corresponding to the first mode, the controller is configured to deactivate the detector driver, and control the light source driver and the data driver to drive predetermined light source pixels of the display portion based on the driving data to display an image.

5. The display of claim 4, wherein the driving data comprises at least one of a driving sequence, a wavelength, and a duration of the predetermined light source pixels of the array of unit pixels.

6. The display of claim 1, wherein in response to an input of driving data corresponding to the second mode, the controller is configured to activate the detector driver, and control the light source driver, the data driver, and the detector driver to drive predetermined light source pixels and predetermined detector pixels of the display portion based on the driving data to acquire an optical signal from an object.

7. The display of claim 6, wherein the driving data comprises a position, a wavelength, and a duration of the predetermined light source pixels to be driven, and a position of the predetermined detector pixels to be driven.

8. The display of claim 1, wherein in response to an input of driving data corresponding to the third mode, the controller is configured to activate the detector driver, and control the light source driver, the data driver, and the detector driver to drive predetermined light source pixels and predetermined detector pixels of the display portion based on the driving data to output an image in a first area of the display portion, and to acquire an optical signal in a second area of the display portion.

9. The display of claim 8, wherein the driving data comprises a driving sequence, a wavelength, and a duration of a first set of the predetermined light source pixels of the array of unit pixels included in the first area, and a position and a wavelength of a second set of the predetermined light source pixels to be driven and a position of the predetermined detector pixels to be driven in the second area.

10. The display of claim 1, wherein:
the converter further comprises a multiplexer (MUX) connected to the outputs of the detector pixels which are integrated for each column of the array of unit pixels, and the analog-digital converter (ADC) is connected to the MUX, and
the inputs of the detector pixels of the array of unit pixels are integrated for each row to be connected to the detector driver.

11. The display of claim 1, wherein:
wherein the inputs of the detector pixels of the array of unit pixels are connected to the detector driver independently of each other.

12. An electronic device comprising:
a display having an array of unit pixels that each respectively include a light source pixel and a detector pixel, and configured to operate in a first mode for displaying an image, a second mode for acquiring an optical signal, and a third mode for displaying the image and acquiring the optical signal; and
a processor configured to:
determine whether the display is to operate in the first mode, the second mode, or the third mode; and
control the display to operate in the first mode, the second mode, or the third mode;
wherein the display comprises a converter configured to be selectively activated based on the display operating in the second mode or the third mode, receive an optical signal from detector pixels of the display, and convert the optical signal into a digital signal,
wherein the converter comprises a plurality of analog-digital converters (ADCs), each connected to one or more detector pixels of the detector pixels of the array of unit pixels, and at least a portion of inputs of the detector pixels of the array of unit pixels are integrated to be connected to a detector driver.

13. The electronic device of claim 12, wherein the processor is configured to:
set the first mode as a default mode; and
based on receiving a request for analyzing an object, control the display to operate in the second mode or the third mode.

14. The electronic device of claim 13, wherein based on receiving the request for analyzing the object, the processor is configured to determine that the display is to operate in the second mode or the third mode based on at least one of a user's request, and a size and a performance of the display.

15. The electronic device of claim 12, wherein the processor is further configured to:
based on determining that the display is to operate in the second mode, control the display to operate in the first mode to display guide information for acquiring the optical signal; and
based on a predetermined period of time elapsing, control the display to operate in the second mode to acquire the optical signal from an object.

16. The electronic device of claim 12, wherein the processor is further configured to:
based on determining that the display is to operate in the third mode, control the display to display guide information for acquiring the optical signal or an analysis result of an object in a first area of the display; and
control the display to acquire the optical signal in a second area of the display.

17. The electronic device of claim 12, wherein the processor is further configured to:
based on determining that the display is to operate in the second mode or the third mode, control the display to acquire a first optical signal from an object; and
control the display to acquire a second optical signal for analyzing the object by analyzing a contact position of the object based on the acquired first optical signal.

18. The electronic device of claim 12, further comprising a fingerprint sensor configured to obtain fingerprint data of an object that contacts the display.

19. The electronic device of claim 18, wherein the processor is further configured to:
  analyze a contact position of the object based on the fingerprint data; and
  control the display to acquire the optical signal or to display guide information based on analyzing the contact position.

20. The electronic device of claim 19, wherein the processor is further configured to:
  obtain a fingerprint feature point based on the fingerprint data; and
  determine a light source pixel and a detector pixel to be driven for acquiring the optical signal based on the obtained fingerprint feature point.

21. The electronic device of claim 12, wherein the processor is further configured to:
  based on acquiring the optical signal from an object according to the second mode or the third mode, perform at least one of bio-information estimation, fingerprint authentication, document scanning, and image scanning by analyzing the object based on the acquired optical signal.

22. The electronic device of claim 12, wherein:
  each of the plurality of analog-digital converters (ADCs) is connected to outputs of the detector pixels which are integrated for each column of the array of unit pixels,
  wherein the inputs of the detector pixels of the array of unit pixels are integrated for each row to be connected to the detector driver.

23. The electronic device of claim 12, wherein:
  each of the plurality of analog-digital converters (ADCs) is connected to an output of each detector pixel of the array of unit pixels,
  wherein the inputs of the detector pixels of the array of unit pixels are integrated to be connected to the detector driver.

24. An electronic device, comprising:
  a display having an array of unit pixels that each respectively include a light source pixel and a detector pixel, and configured to operate in a first mode for displaying an image, a second mode for acquiring an optical signal, and a third mode for displaying an image and acquiring an optical signal; and
  a processor configured to:
    based on receiving a request for estimating bio-information, control the display to operate in the second mode or the third mode to acquire a first optical signal from an object; and
    estimate bio-information based on the acquired first optical signal,
  wherein the display comprises:
  a display portion formed of the array of unit pixels;
  a control driver including a light source driver and a data driver which are respectively connected to each light source pixel, and a detector driver which is connected to each detector pixel;
  a controller configured to control the control driver to operate the display portion in the first mode, the second mode, and the third mode; and
  a converter configured to be selectively activated by the controller based on the display portion operating in the second mode or the third mode, receive an optical signal from detector pixels of the display portion, and convert the optical signal into a digital signal,
  wherein the converter comprises an analog-digital converter (ADC) connected to outputs of the detector pixels, and at least a portion of inputs of the detector pixels are connected to the detector driver independently of another portion of the inputs of the detector pixels.

25. The electronic device of claim 24, wherein the display is configured to acquire the first optical signal by driving pairs of one or more light source pixels and detector pixels in a first area touched by the object.

26. The electronic device of claim 25, wherein the processor is further configured to determine the pairs of the light source pixels and the detector pixels in the first area based on a predetermined reference point in the first area.

27. The electronic device of claim 26, wherein the predetermined reference point comprises at least one of a center point of the first area and a fingerprint feature point which is obtained based on fingerprint data obtained by contact of the object.

28. The electronic device of claim 25, wherein the display is further configured to acquire the first optical signal while acquiring a plurality of second optical signals by driving pairs of a plurality of light source pixels and detector pixels in a second area including the first area.

29. The electronic device of claim 28, wherein the processor is further configured to:
  correct the first optical signal based on the plurality of second optical signals; and
  estimate the bio-information based on the corrected first optical signal.

30. The electronic device of claim 24, further comprising a force sensor configured to measure a contact force based on the object, which is in contact with the display, applying pressure to the display.

31. The electronic device of claim 30, wherein the processor is further configured to:
  based on the object being in contact with the display, obtain a contact area based on a magnitude of an amount of light which is received by the detector pixel of the display;
  obtain a contact pressure based on the contact force and the contact area; and
  estimate the bio-information based on the contact pressure and the first optical signal.

32. The electronic device of claim 24, wherein the bio-information comprises at least one of blood pressure, vascular age, arterial stiffness, aortic pressure waveform, vascular compliance, stress index, fatigue level, skin elasticity, skin age, triglyceride, cholesterol, blood glucose, and antioxidant index.

* * * * *